US007215657B2

(12) United States Patent
Toshimitsu et al.

(10) Patent No.: US 7,215,657 B2
(45) Date of Patent: May 8, 2007

(54) RADIO BASE STATION AND FRAME CONFIGURATION METHOD USING TDMA SCHEME AND SDMA SCHEME

(75) Inventors: Kiyoshi Toshimitsu, Minato-ku (JP); Hideo Kasami, Minato-ku (JP); Yuzo Tamada, Minato-ku (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 961 days.

(21) Appl. No.: 09/837,329

(22) Filed: Apr. 19, 2001

(65) Prior Publication Data

US 2002/0021684 A1    Feb. 21, 2002

(30) Foreign Application Priority Data

Apr. 21, 2000    (JP) ............................. 2000-120633

(51) Int. Cl.
H04B 7/212    (2006.01)
(52) U.S. Cl. ........................................ 370/337; 370/348
(58) Field of Classification Search ................ 370/337, 370/369, 375, 380, 328, 329, 330, 336, 341, 370/348; 455/562.1, 561; 342/354
See application file for complete search history.

(56) References Cited

U.S. PATENT DOCUMENTS

| | | | | |
|---|---|---|---|---|
| 4,004,098 A | * | 1/1977 | Shimasaki | 370/325 |
| 5,260,968 A | * | 11/1993 | Gardner et al. | 375/347 |
| 5,408,237 A | * | 4/1995 | Patterson et al. | 342/354 |
| 5,736,959 A | * | 4/1998 | Patterson et al. | 342/354 |
| 5,805,576 A | * | 9/1998 | Worley et al. | 370/337 |
| 5,936,577 A | * | 8/1999 | Shoki et al. | 342/373 |
| 6,067,290 A | * | 5/2000 | Paulraj et al. | 370/329 |
| 6,212,387 B1 | * | 4/2001 | McLaughlin et al. | 455/450 |
| 6,600,776 B1 | * | 7/2003 | Alamouti et al. | 374/147 |
| 2002/0080816 A1 | * | 6/2002 | Spinar et al. | 370/449 |

FOREIGN PATENT DOCUMENTS

| | | |
|---|---|---|
| JP | 11-313364 | 11/1999 |
| WO | WO 98/16077 | 4/1998 |
| WO | WO 98/30047 | 7/1998 |
| WO | WO 99/22547 | 5/1999 |
| WO | WO 99/26425 | 5/1999 |

OTHER PUBLICATIONS

J. Torsner, et al., Vehicular Technology Conference, XP-010342076, pp. 1217-1221, "Radio Network Solutions for HIPERLAN/2", May 16, 1999.
R. Sinha, et al., Personal, Indoor, and Mobile Radio Communications, XP-010314596, pp. 942-946, "Forward Link Capacity in Smart Antenna Basestations With Dynamic Slot Allocation" Sep. 8, 1998.
Ulrich Vornefeld, et al., "SDMA Techniques for Wireless ATM", IEEE Communications Magazine, Nov. 1999, pp. 52, 53, 56, and 57.

* cited by examiner

Primary Examiner—Seema S. Rao
Assistant Examiner—Kevin Mew
(74) Attorney, Agent, or Firm—Oblon, Spivak, McClelland, Maier & Neustadt, P.C.

(57) ABSTRACT

In a radio base station, a plurality of time division multiplexed frames are transmitted through a plurality of space dividing beams such that it becomes possible for the radio base station to realize the radio communications with different radio terminals at the same time using the same frequency, by using a scheduling processing which allocates communication bandwidths to the radio terminals such that there is substantially no mutual interference among those signals to be transferred by different frames, with respect to a plurality of frames that are corresponding to at least one of the plurality of space dividing beams.

4 Claims, 16 Drawing Sheets

BCH : BROADCAST CHANNEL
FCH : FRAME CHANNEL

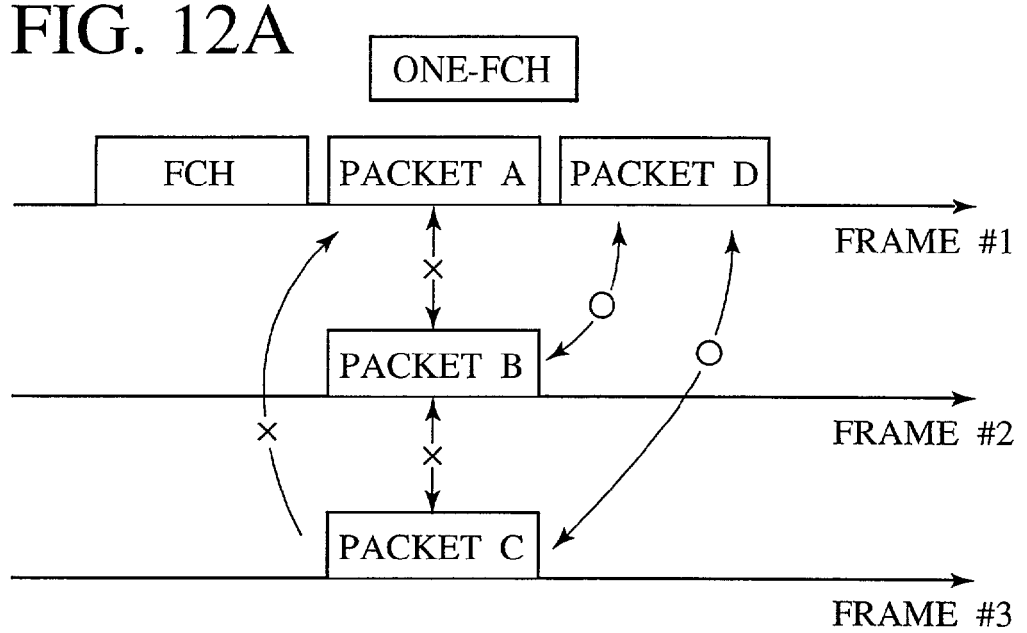
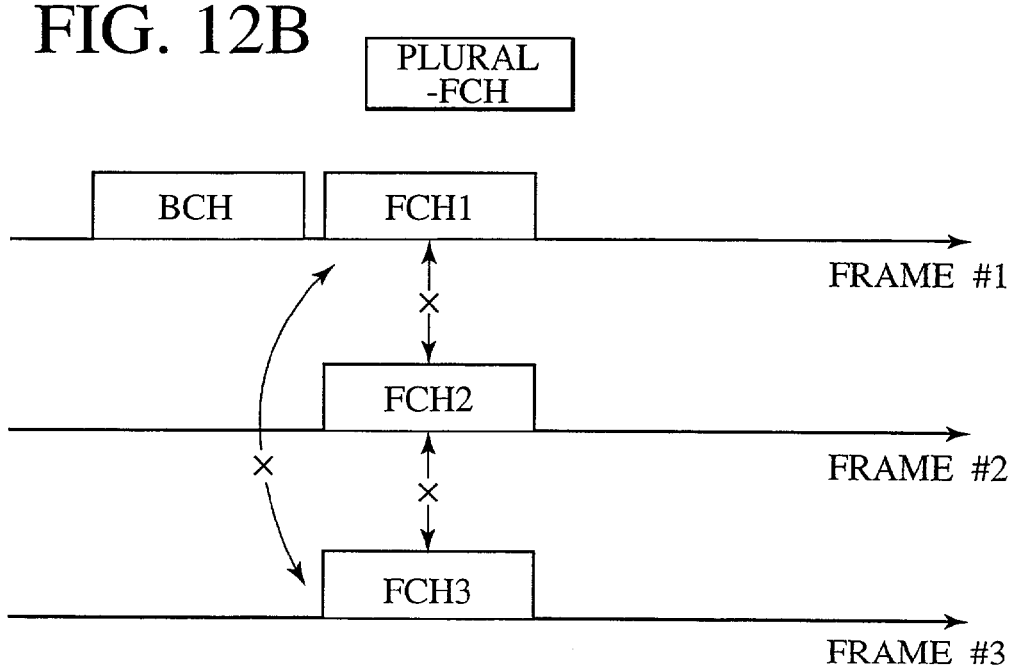

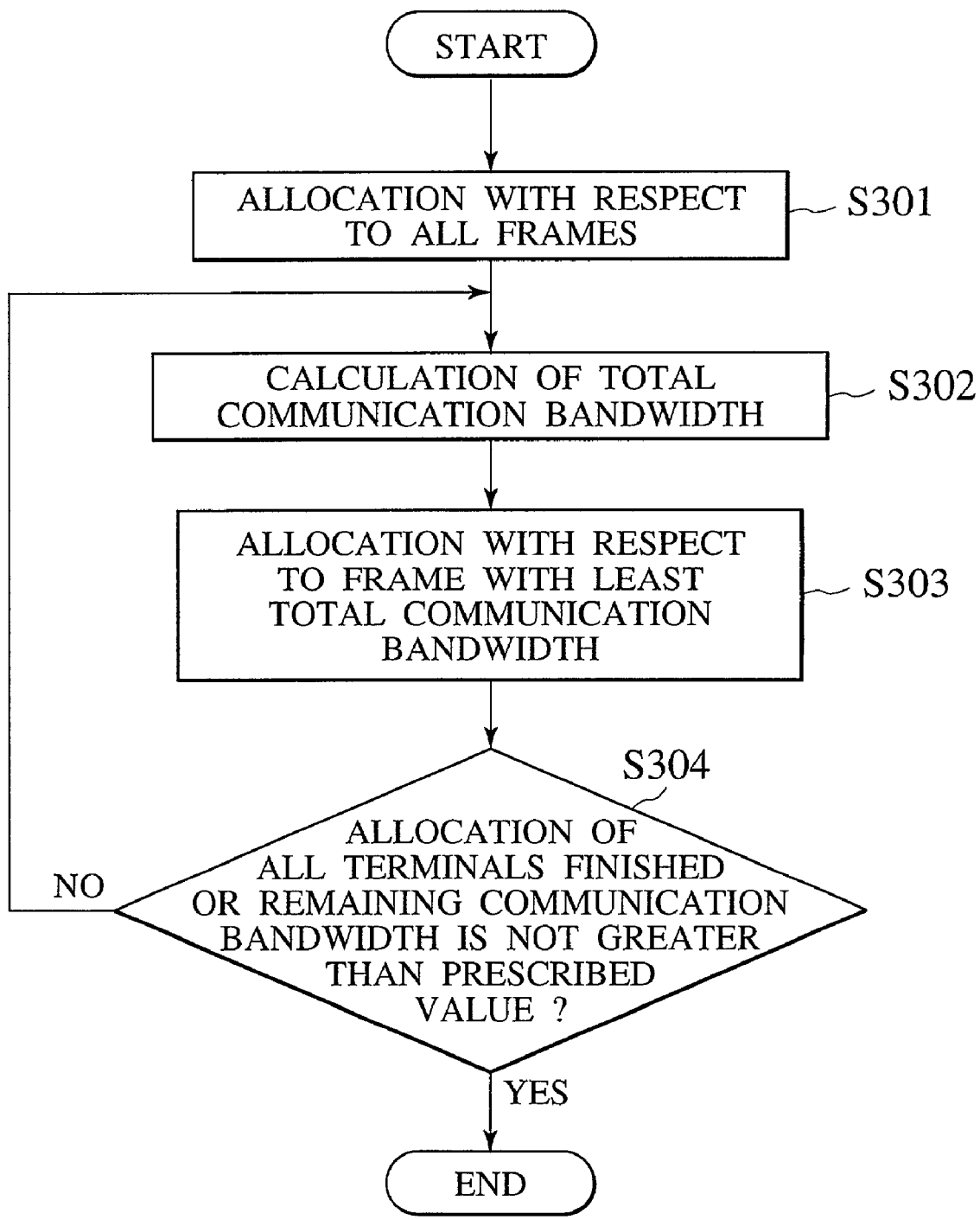

RADIO BASE STATION AND FRAME CONFIGURATION METHOD USING TDMA SCHEME AND SDMA SCHEME

BACKGROUND OF THE INVENTION

1. Field of the Invention

The present invention relates to a radio base station for carrying out radio communications with a plurality of radio terminals by adopting both a time division multiple access scheme and a space division multiple access scheme, and a frame configuration method for the radio base station.

2. Description of the Related Art

In recent years, demands for the radio data communications are increasing, and in conjunction with this, requests for allocating necessary radio bandwidths to respective radio terminals are also increasing. In order to make the radio bandwidths to be allocated to respective radio terminals variable, there is a need for a scheduler that makes radio bandwidth allocation adjustment among users. For example, a HIPERLAN2 proposed in the ESTI-BRAN (European Tele communications Standards Institute-Broadband Radio Access Networks) and a HiSWANa (High Speed Wireless Access Network a) proposed in the ARIB-MMAC (Association of Radio Industries and Businesses-Multimedia Mobile Access Communication systems) are radio systems of the centralized control type in which a MAC (Media Access Control) of the radio base station determines a frame configuration of each frame and broadcasts it to the radio terminal. For this reason, the HIPERLAN2 and HiSWANa are applicable not only to the radio LAN but also to a subscriber radio system called FWA (Fixed Wireless Access).

On the other hand, in order to utilize the limited radio frequencies effectively, a scheme called SDMA (Space Division Multiple Access) has been proposed recently. This is a scheme for suppressing interferences among radio terminals by controlling the antenna directivity. In this scheme, the radio base station is required to have one or more modulation/demodulation units in order to enable communications with different radio terminals at the same time using the same frequency.

However, up to now, there has been no proposition for a specific frame configuration method suitable for the case where a plurality of modulation/demodulation units are provided in a radio base station that carries out radio communications in the TDMA (Time Division Multiple Access) scheme using a frame configuration.

BRIEF SUMMARY OF THE INVENTION

It is therefore an object of the present invention to provide a radio base station and a frame configuration method capable of making communication bandwidths to be allocated to respective radio terminals variable at a time of carrying out radio communications with respect to a plurality of radio terminals by adopting both the TDMA scheme and the SDMA scheme.

According to one aspect of the present invention there is provided a radio base station for transferring signals of time division multiplexed frames with respect to a plurality of radio terminals, the radio base station comprising: a beam formation unit configured to form a plurality of space dividing beams simultaneously; a plurality of antenna elements configured to transfer the signals with respect to the radio terminals by transmitting the plurality of space dividing beams toward the radio terminals; and a scheduling processing unit configured to allocate communication bandwidths to the radio terminals such that there is substantially no mutual interference among those signals to be transferred by different frames, with respect to a plurality of frames that are corresponding to at least one of the plurality of space dividing beams.

According to another aspect of the present invention there is provided a frame configuration method for time division multiplexed frames to transfer signals between a radio base station and a plurality of radio terminals, the frame configuration method comprising: (a) allocating an entire frame configuration information indicating frame configurations of all the time division multiplexed frames to one of the time division multiplexed frames; and (b) allocating communication bandwidths of an identical time in different frames to different radio terminals such that there is substantially no mutual interference among those signals to be transferred at the identical time with respect to the different radio terminals.

According to another aspect of the present invention there is provided a frame configuration method for time division multiplexed frames to transfer signals between a radio base station and a plurality of radio terminals, the frame configuration method comprising: (a) allocating a plurality of frame configuration information each indicating a frame configuration of a respective time division multiplexed frame, to corresponding ones of the time division multiplexed frames respectively; and (b) allocating communication bandwidths in different frames to different radio terminals such that there is substantially no mutual interference among those signals to be transferred with respect to the different radio terminals.

According to another aspect of the present invention there is provided a computer usable medium having computer readable program codes embodied therein for causing a computer to function as a scheduling processing unit in a radio base station for transferring signals of time division multiplexed frames with respect to a plurality of radio terminals, the computer readable program codes include: a first computer readable program code for causing said computer to allocate an entire frame configuration information indicating frame configurations of all the time division multiplexed frames to one of the time division multiplexed frames, or allocate a plurality of frame configuration information each indicating a frame configuration of a respective time division multiplexed frame, to corresponding ones of the time division multiplexed frames respectively; and a second computer readable program code for causing said computer to allocate communication bandwidths of an identical time in different frames to different radio terminals such that there is substantially no mutual interference among those signals to be transferred at the identical time with respect to the different radio terminals, or allocate communication bandwidths in different frames to different radio terminals such that there is substantially no mutual interference among those signals to be transferred with respect to the different radio terminals.

Other features and advantages of the present invention will become apparent from the following description taken in conjunction with the accompanying drawings.

BRIEF DESCRIPTION OF THE DRAWINGS

FIGS. 12A and 12B are diagrams for explaining differences between the frame configuration of FIG. 9 and the frame configuration of FIG. 11.

FIG. 19 is a flow chart showing a processing procedure of a frame configuration scheduling method using PLURAL-FCH according to one embodiment of the present invention.

DETAILED DESCRIPTION OF THE INVENTION

Figure 1:
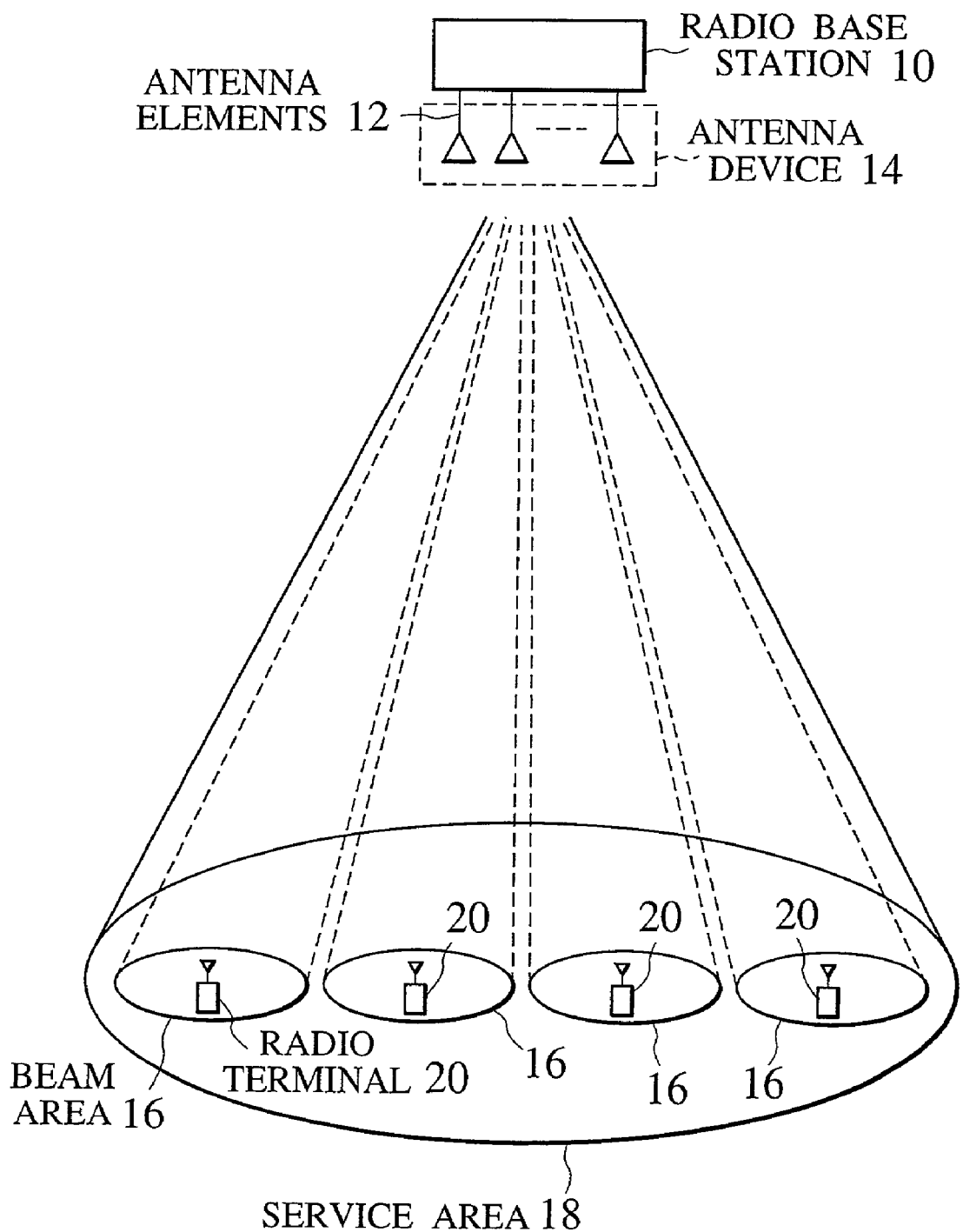
FIG. 1 is a schematic block diagram showing a configuration of a radio communication system according to one embodiment of the present invention.

Referring now to FIG. 1 to FIGS. 20A and 20B, one embodiment of a radio base station and a frame configuration method according to the present invention will be described in detail. Note that the same or similar elements are given the same or similar reference numerals in these figures.

FIG. 1 shows a configuration of a radio communication system using a radio base station according to this embodiment. As shown in FIG. 1, the radio base station 10 of this embodiment has an antenna device 14 which is formed by a plurality of antenna elements 12 and capable of forming a plurality of beam patterns, a modulation unit (not shown) for modulating transmission data, and a demodulation unit (not shown) for demodulating received radio signals. Of course, it is also possible to use a configuration using a modulation/demodulation unit in which the modulation unit and the demodulation unit are integrated. Then, a plurality of beam areas 16 formed by the beam patterns of the radio base station 10 constitute a service area 18 of this communication system. The radio base station 10 executes transmission/reception of radio signals with respect to a radio terminal 20 having a radio signal transmission/reception function which is located within the service area 18, by forming a plurality of beam patterns.

Figure 2:
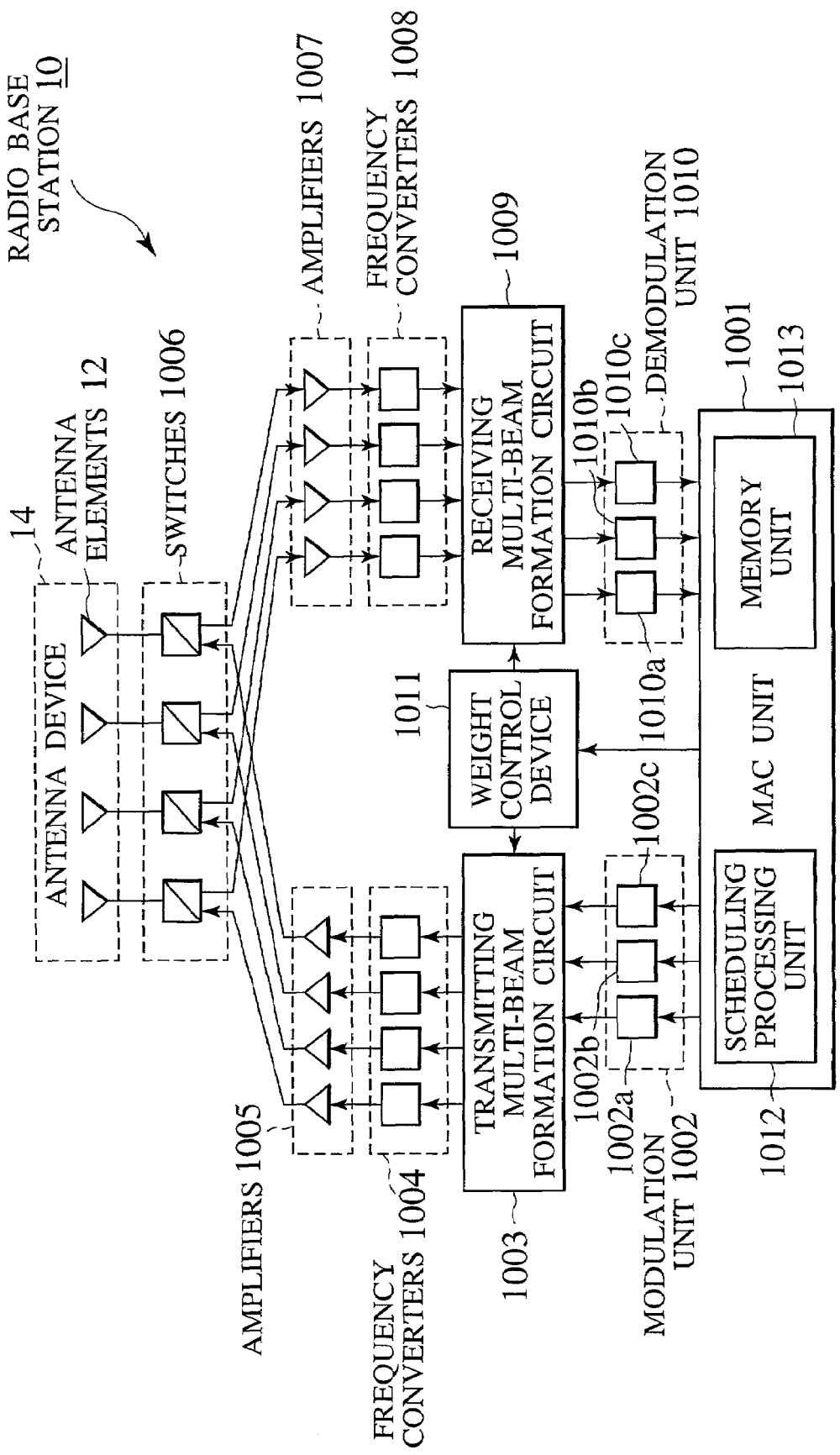
FIG. 2 is a block diagram showing a configuration of a radio base station in the radio communication system of FIG. 1.

FIG. 2 shows a detailed configuration of the radio base station 10 according to this embodiment. As shown in FIG. 2, the radio base station 10 of this embodiment has a MAC (Media Access Control) unit 1001 for carrying out assembling of frames to be utilized for transmission/reception of radio signals with respect to the radio terminal 20 and allocation of communication bandwidths to these frames. Then, the MAC unit 1001 is provided with a scheduling processing unit 1012 for from configuration and a memory unit 1013 for storing terminal information of each radio terminal 20, for the purpose of realizing the function of the MAC unit 1001. In FIG. 2, the number of antenna elements 12 in the antenna device 14 is assumed to be four and the antenna device 14 is assumed to be shared by a transmitting side and a receiving side, for the sake of the simplicity.

As shown in FIG. 2, switches 1006 are connected to the antenna elements 12 in correspondences to respective antenna elements. Then, the switching between transmission and reception of the antenna device 14 is realized by switching the switches 1006.

In the receiving side, the signals received by the antenna elements 12 are entered into amplifiers (low noise amplifiers) 1007 corresponding to the respective antenna elements 12 through the switches 1006. The entered received signals are amplified by the amplifiers 1007.

The amplified received signals are applied with a frequency conversion from an RF band into an IF band or a baseband by frequency converters 1008. In this IF band or the baseband, the receiving multi-beam formation circuit 1009 forms a plurality of receiving beams simultaneously by carrying out a prescribed weighting with respect to each received signal outputted by each frequency converter 1008. This weighting is executed according to a weighting control device 1011.

Figure 3:
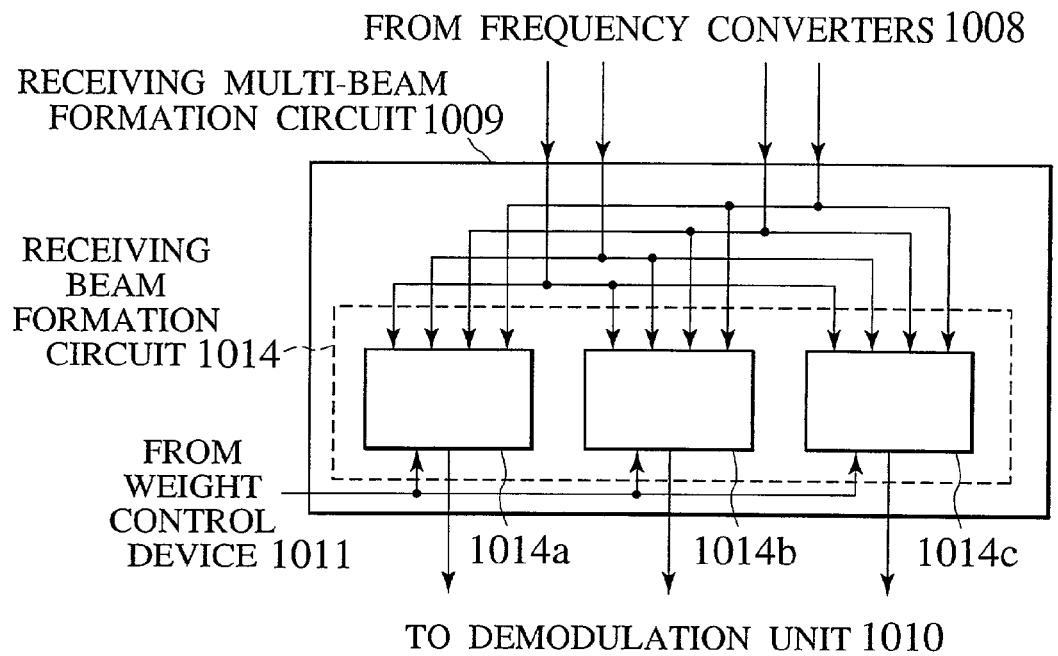
FIG. 3 is a block diagram showing a configuration of a receiving multi-beam formation circuit in the radio base station of FIG. 2.

FIG. 3 shows a detailed configuration of the receiving multi-beam formation circuit 1009 of FIG. 2. In FIG. 3, the number of beams to be simultaneously formed is assumed to be three. The received signals outputted from each frequency converter 1008 are entered into a corresponding receiving beam formation circuit 1014 (1014a, 1014b, 1014c). Each receiving beam formation circuit 1014 combines the entered received signals by weighting them according to weights set by the weight control device 1011. Then, each receiving beam formation circuit 1014 outputs weighted and combined signals to a corresponding demodulation unit 1010.

Figure 4:
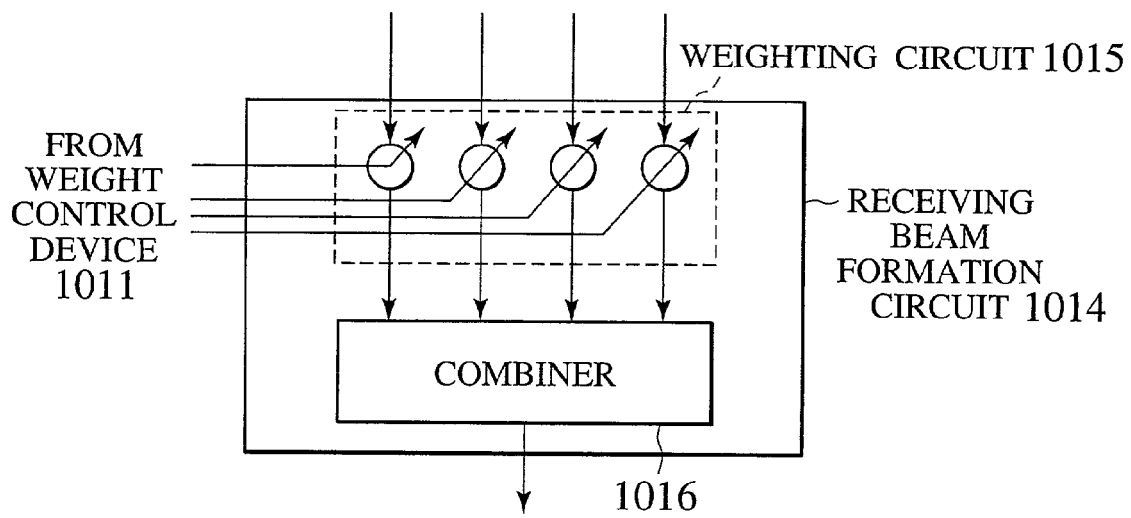
FIG. 4 is a block diagram showing a configuration of a receiving beam formation circuit in the receiving multi-beam formation circuit of FIG. 3.

FIG. 4 shows a detailed configuration of a receiving beam formation circuit 1014 of FIG. 3. The received signals outputted from each frequency converter 1008 are entered into a corresponding weighting circuit 1015, where the prescribed weighting is carried out. Here, the method of weighting at the weighting circuit 1015 can be an amplitude weighting, a phase weighting, or an amplitude and phase weighting, for example. The weighted received signals are them combined by a combiner 1016.

On the other hand, in the transmitting side, the transmission signals modulated by the modulation units 1002 are outputted to the transmitting multi-beam formation circuit 1003 as shown in FIG. 2. The transmitting multi-beam formation circuit 1003 forms a plurality of receiving beams simultaneously by carrying out a prescribed weighting with respect to each transmission signal modulated by each modulation unit 1002. This weighting is also executed according to the weighting control device 1011. The amount of weight is set up such that the beam patterns of the transmitting side and the receiving side coincide with each other for the identical radio terminal 20.

Figure 5:
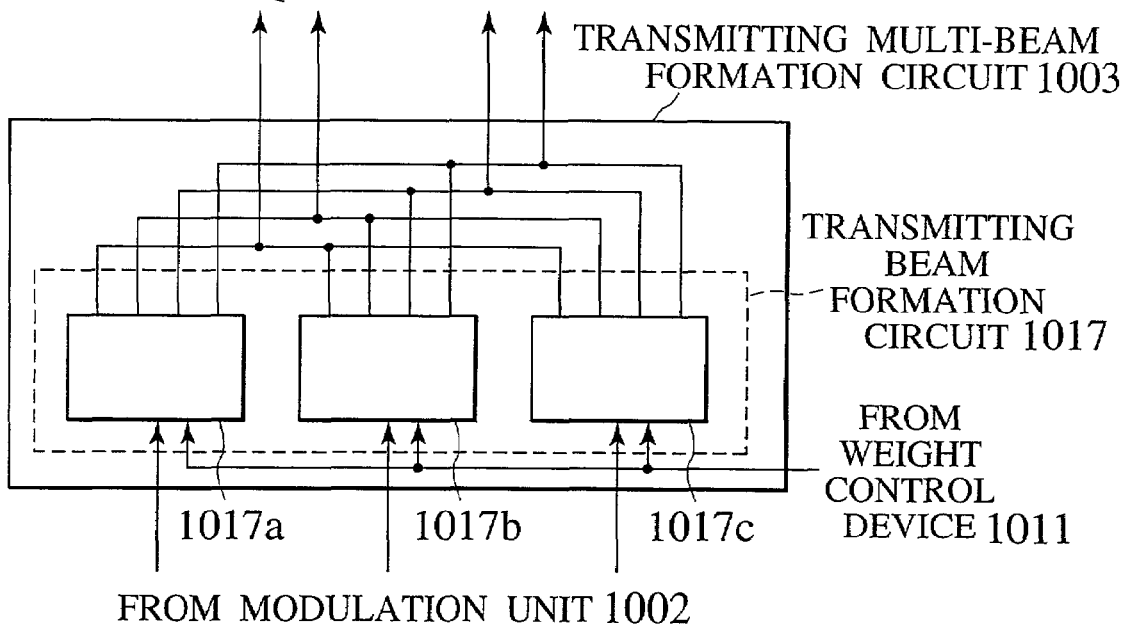
FIG. 5 is a block diagram showing a configuration of a transmitting multi-beam formation circuit in the radio base station of FIG. 2.

FIG. 5 shows a detailed configuration of the transmitting multi-beam formation circuit 1003 of FIG. 2. The transmission signals outputted from each modulation unit 1002 are entered into a corresponding transmitting beam formation circuit 1017 (1017a, 1017b, 1017c). Each transmitting beam formation circuit 1017 combines the entered transmission signals by weighting them according to weights set by the weight control device 1011. Then, each transmitting beam formation circuit 1017 outputs weighted and combined signals to a corresponding frequency converter 1004.

Figure 6:
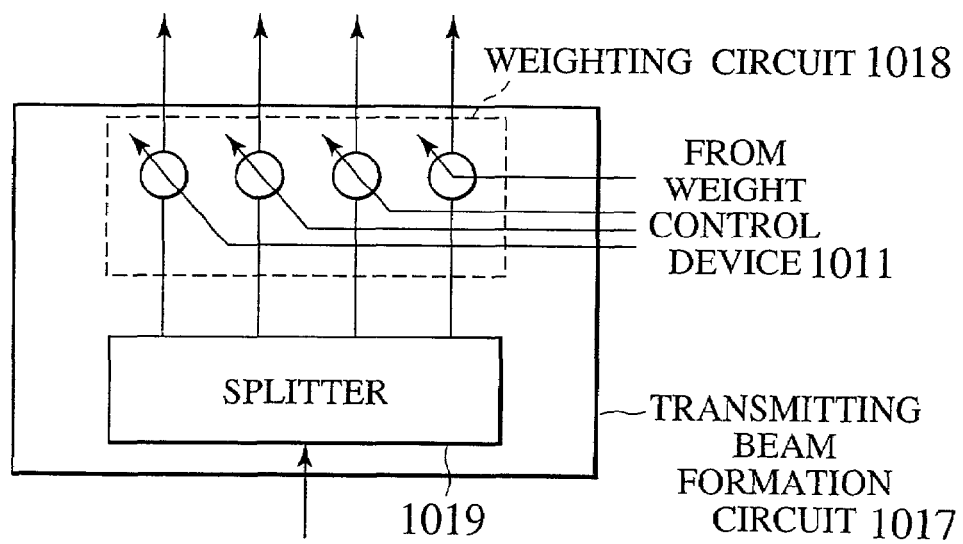
FIG. 6 is a block diagram showing a configuration of a transmitting beam formation circuit in the transmitting multi-beam formation circuit of FIG. 5.

FIG. 6 shows a detailed configuration of the transmitting beam formation circuit 1017 of FIG. 5. The transmission signals outputted from each modulation unit 1002 are split by a splitter 1019, and each split signal is entered into a corresponding weighting circuit 1018, where the prescribed weighting is carried out.

Then, as shown in FIG. 2, each one of four beams formed by the transmitting multi-beam formation circuit 1003 is applied with a frequency conversion into the RF band by a corresponding frequency converter 1004, and each frequency converted transmission signal is amplified by a corresponding amplifier (high output amplifier) 1005. Then, the transmission signals are transmitted from the corresponding antenna elements 12 through the switches 1006 to the radio terminal 20.

In the radio base station 10 of this embodiment, the weight control device 1011 derives an appropriate amount of weight for each radio terminal 20 as described above at a time of carrying out the radio communications with respect to the radio terminals 20 of FIG. 1. Then, the derived amount of weight for each radio terminal 20 is stored into the memory unit 1013 of FIG. 2 in correspondence to an identifier of that radio terminal 20. The weight control device 1011 can read out the appropriate amount of weight for each radio terminal 20 from the memory unit 1013 whenever necessary.

The MAC unit 1001 is connected with each modulation unit 1002 and each demodulation unit 1010, and constructs frames corresponding to each modulation unit 1002 and each demodulation unit 1010.

In the case of TDMA/TDD (Time Division Multiple Access/Time Division Duplex) scheme, one frame is constructed for a pair of the modulation unit 1002a and the demodulation unit 1010a, for example. Similarly, one frame is constructed for a pair of the modulation unit 1002b and the demodulation unit 1010b, and one frame is constructed for a pair of the modulation unit 1002c and the demodulation unit 1010c. In this embodiment, a pair of the modulation unit and the demodulation unit are regarded as one modulation/demodulation unit.

In the case of TDMA/FDD (Time Division Multiple Access/Frequency Division Duplex) scheme, one transmission frame is constructed for the modulation unit 1002a while one reception frame is constructed for the demodulation unit 1010a, and the communications (transmission and reception) are carried out by using these transmission frame and the reception frame as a pair. Similarly, one transmission frame is constructed for the modulation unit 1002b or 1002c while one reception frame is constructed for the demodulation unit 1010b or 1010c, and the communications are carried out by using these transmission frame and the reception frame as a pair. In this embodiment, the modulation unit and the demodulation unit whose transmission frame and reception frame forms a pair are regarded as one modulation/demodulation unit.

The weight control device 1011 provided in association with the MAC unit 1001 derives an appropriate amount of weight for each radio terminal 20 of FIG. 1 such that the optimum beam pattern for each radio terminal 20 will be formed. This weight control device 1011 can be provided with a function for measuring intensities or signal waveforms of the received signals at each antenna element 12, for example, such that the antenna beam formation at the receiving side can be carried out adaptively. For this antenna beam formation, only those antenna elements 12 with high received signal intensities can be selected so as not to transmit unnecessary radio signals (interference signals) received by the other antenna elements 12, or it is possible to derive the weights for enabling the simultaneous formation of a plurality of beams such that a main beam of an array antenna is set in a direction from which the desired signals are arriving while a null point of the directivity is set in a direction from which the interference signals are arriving, by using an adaptive control algorithm according to the received signals, for example.

When the location information of the radio terminal 20 can be acquired, it is also possible to derive the optimum amount of weight by utilizing that location information. Of course, the present invention is not limited to any specific method for deriving the amount of weight.

In this embodiment, the optimum weight for each radio terminal 20 that is derived by a prescribed method is maintained in the memory unit 1013 for each radio terminal 20, in correspondence to an identifier of each radio terminal 20. Then, at a time of carrying out the radio communications with one radio terminal 20, the weight corresponding to the identifier of that radio terminal 20 is read out from the memory unit 1013, and the read out weight is set into the transmitting multi-beam formation circuit 1003 and the receiving multi-beam formation circuit 1009.

Next, a frame configuration to be used in the radio communication system according to this embodiment will be described. The scheduling processing unit 1012 of the radio base station 10 carries out an allocation of a radio bandwidth with respect to each radio terminal 20 and constructs frames for each modulation/demodulation unit by utilizing the above described weight for each radio terminal 20. Here, the exemplary case of using TDMA/TDD frames will be described for the sake of explanation. Of course, the present invention is not limited to this case of using TDMA/TDD frames.

Figure 7:
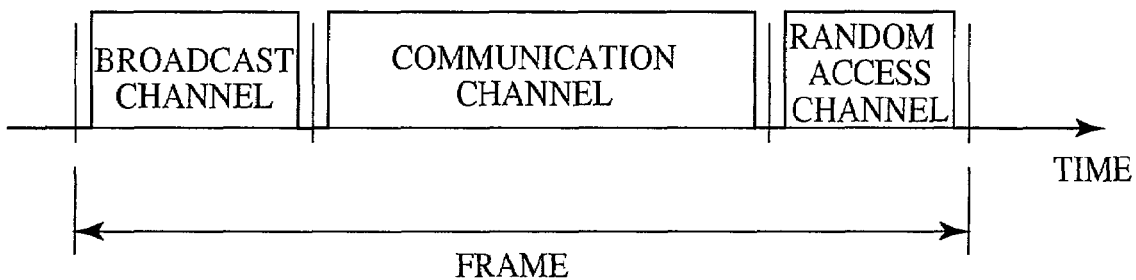
FIG. 7 is a diagram showing a general TDMA/TDD frame configuration.
Figure 8:
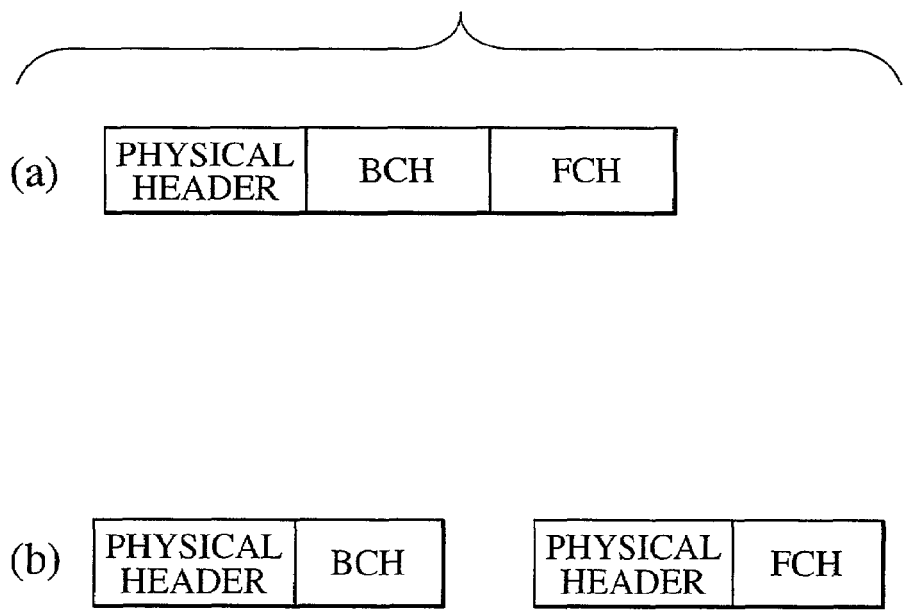
FIG. 8 is a diagram showing exemplary broadcast channel contents that can be used in the radio communication system of FIG. 1.

FIG. 7 shows a configuration of a general TDMA/TDD frame. This TDMA/TDD frame is an exemplary basic frame configuration in the case of using one modulation/demodulation unit, which comprises a broadcast channel, a communication channel, and a random access channel as shown in FIG. 7.

The broadcast channel is a channel for notifying control information such as an identifier of the radio base station 10 and a constituent elements of this frame (bandwidth allocation notice). In the following, in particular, a channel for communicating control information such as an identifier will be referred to as BCH (Broadcast Channel), while a channel for communicating frame constituent elements will be referred to as FCH (Frame Channel). Also, the communication channel is a channel for carrying out communications between the radio base station 10 and the radio terminal 20. The random access channel is a channel to be utilized random accesses such as that at a time of the start of communications. Note that, in the frame configuration of FIG. 7, the broadcast channel (BCH, FCH), the communication channel and the random access channel are arranged in this order, but the order among channels is not necessarily limited to this specific case.

The frame configuration of FIG. 7 is for the case of using one modulation/demodulation unit, and the frame configuration for the case of using a plurality of modulation/demodulation units is also basically similar to that shown in FIG. 7, except that the frame configuration is slightly different depending on whether BCH and FCH are to be handled as a single broadcast channel (which will be referred to as "ONE-FCH" hereafter) or separate channels (which will be referred to as "PLURAL-FCH" hereafter). In the following, the case of transmitting BCH and FCH as a single information as shown in a part (a) of FIG. 8 and the case of transmitting BCH and FCH as separate information as shown in a part (b) of FIG. 8 will be described.

(ONE-FCH)

In the case of ONE-FCH, the radio base station 10 needs to notify the frame configuration corresponding to all the modulation units and demodulation units to each radio terminal 20 by a single FCH. To this end, the radio base station 10 needs to modulate both FCH and BCH by the same modulation unit and transmit them without any directivity to all the radio terminals 20 within the service area 18 by using the antenna device 14 with no directivity.

Figure 9:
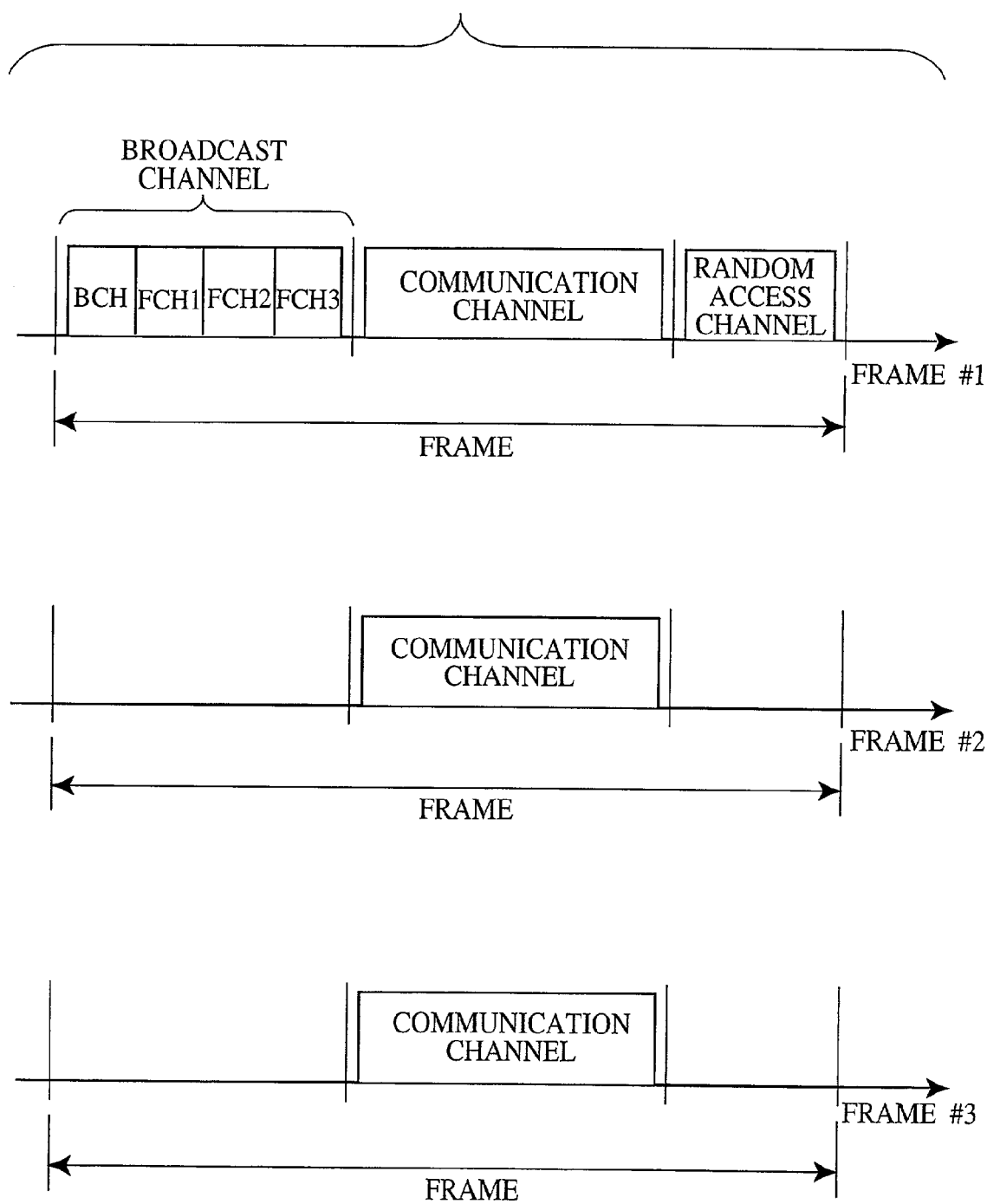
FIG. 9 is a diagram showing a frame configuration that can be used in the radio communication system of FIG. 1 in the case of ONE-FCH.
Figure 10:
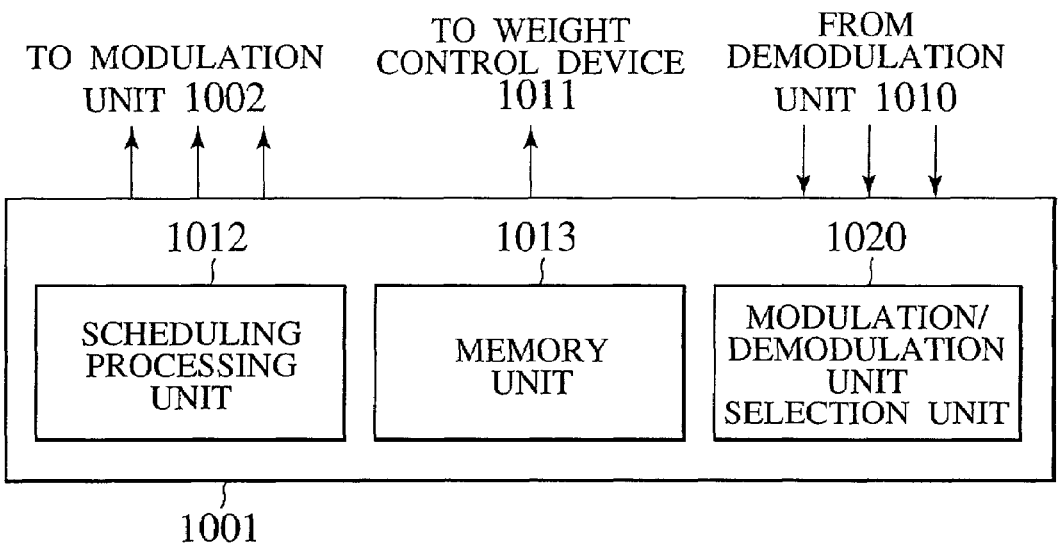
FIG. 10 is a block diagram showing a modified configuration of a MAC unit in the radio base station of FIG. 2.

FIG. 9 shows the frame configuration in the case of ONE-FCH. FIG. 9 is directed to the case of using three modulation units 1002 and three demodulation units 1010 as shown in FIG. 2, where the transmission and reception processing is carried out by handling the modulation unit 1002*a* and the modulation unit 1010*a* in pair, the modulation unit 1002*b* and the demodulation unit 1010*b* in pair, and the modulation unit 1002*c* and the demodulation unit 1010*c* in pair. Here, it is assumed that the frame formed by the modulation unit 1002*a* and the demodulation unit 1010*a* is "frame #1", the modulation unit 1002*b* and the demodulation unit 1010*b* is "frame #2", and the modulation unit 1002*c* and the demodulation unit 1010*c* is "frame #3", In the case of the frame configuration of FIG. 9, the frame configuration for the frames #1, #2 and #3 will be notified to each radio terminal 20 by a single FCH. In the case of transmission without any directivity at the antenna device 14, one of a plurality of the modulation units 1002 is selected. This selection may be made by providing a modulation/demodulation unit selection unit 1020 in the MAC unit 1001 as shown in FIG. 10, for example. Namely, it is possible to use a configuration in which the transmission is realized by selecting one of a plurality of the modulation units 1002 by this modulation/demodulation unit selection unit 1020 and carrying out the modulation processing by the selected modulation unit 1002. Similarly, in the case of reception without any directivity at the antenna device 14, the reception is realized by selecting one of a plurality of the demodulation units 1010 by this modulation/demodulation unit selection unit 1020 and carrying out the demodulation processing by the selected demodulation unit 1010.

Here, the modulation/demodulation unit selection unit 1020 may be configured to select one modulation unit 1002 and one demodulation unit 1010 for each frame, or select the predetermined modulation unit 1002 and demodulation unit 1010 in the case of transmission and reception without any directivity.

(PLURAL-FCH)

In the case of PLURAL-FCH, the radio base station 10 first transmits BCH without any directivity to all the radio terminals 20 simultaneously by using the antenna with no directivity. Then, FCHs of the respective frames are modulated by utilizing the respectively corresponding modulation units 1002, and transmitted to the respectively corresponding radio terminals 20 simultaneously by using the antennas with the antenna directivities suitable for the respective FCHs.

Figure 11:
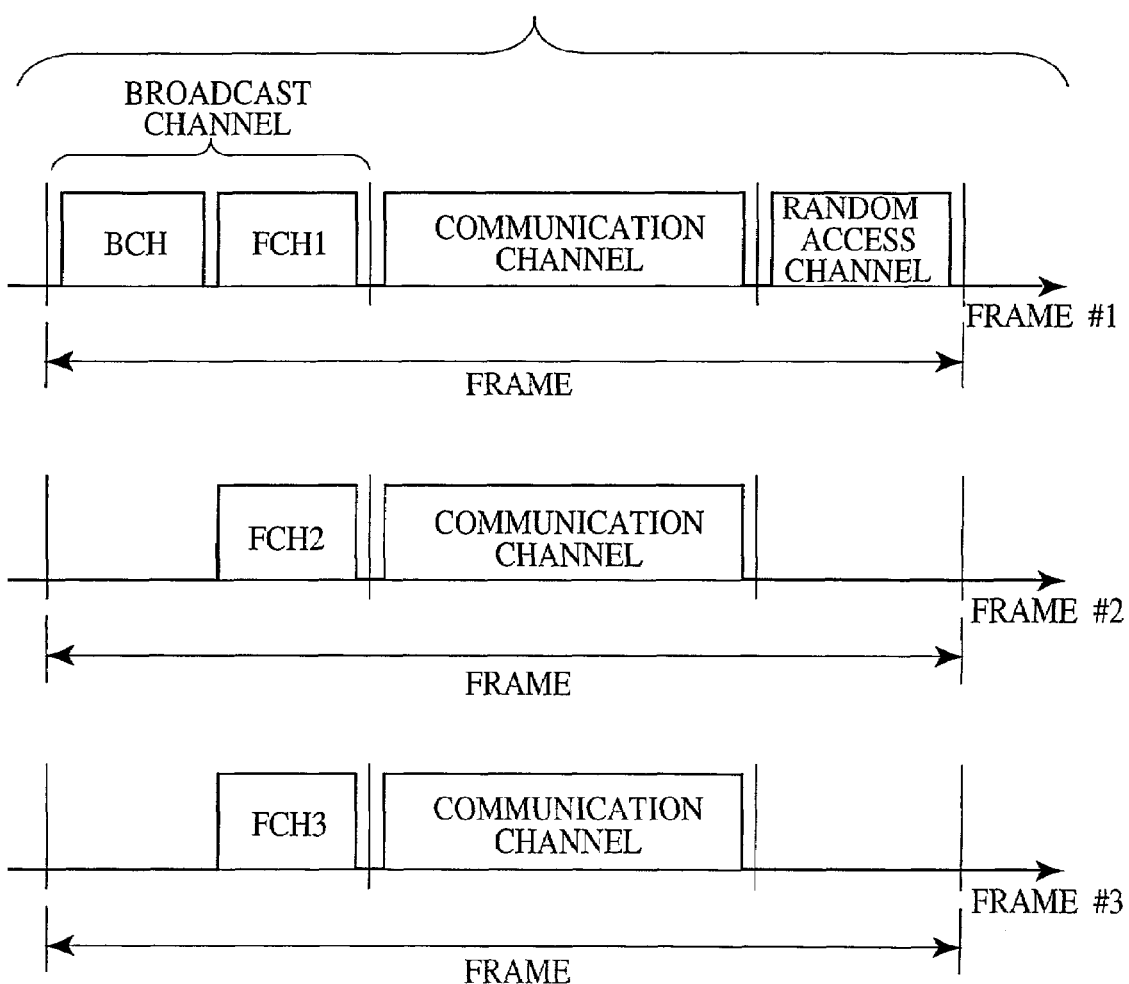
FIG. 11 is a diagram showing a frame configuration that can be used in the radio communication system of FIG. 1 in the case of PLURAL-FCH.

FIG. 11 shows the frame configuration in the case of PLURAL-FCH. FIG. 11 is also directed to the case of using three modulation units 1002 and three demodulation units 1010 as shown in FIG. 2, where the transmission and reception processing is carried out by handling the modulation unit 1002*a* and the modulation unit 1010*a* in pair, the modulation unit 1002*b* and the demodulation unit 1010*b* in pair, and the modulation unit 1002*c* and the demodulation unit 1010*c* in pair. Here, it is also assumed that the frame formed by the modulation unit 1002*a* and the demodulation unit 1010*a* is "frame #1", the modulation unit 1002*b* and the demodulation unit 1010*b* is "frame #2", and the modulation unit 1002*c* and the demodulation unit 1010*c* is "frame #3", In the case of the frame configuration of FIG. 11, one FCH (FCH1) to be transmitted after being modulated at the modulation unit 1002*a* will notify the frame configuration for the frame #1, one FCH (FCH2) to be transmitted after being modulated at the modulation unit 1002*b* will notify the frame configuration for the frame #2, and one FCH (FCH3) to be transmitted after being modulated at the modulation unit 1002*c* will notify the frame configuration for the frame #3.

Next, the features of the above described ONE-FCH and PLURAL-FCH will be described. In the case of ONE-FCH, the frame configuration for the frames #1, #2 and #3 formed by all the pairs of the modulation units 1002 and the modulation unit 1010 will be notified by using a single FCH. For this reason, FCH becomes a relatively long and it becomes impossible to increase the communication bandwidth for the communication channel any further. On the other hand, in the case of PLURAL-FCH, FCH will be transmitted for each frame, so that FCH can be relatively short and the communication bandwidth for the communication channel can be increased as much. However, in this case, there is a need to carry out the transmission such that there is no mutual interferences among FCH1, FCH2 and FCH3.

These facts implies the following from a viewpoint of the scheduling algorithm for the communication channels of the frames #1, #2 and #3. Namely, in the case of ONE-FCH, the frame configuration for all the frames #1, #2 and #3 will be notified to each radio terminal 20 simultaneously by a single FCH. For this reason, there is no need to account for the interferences among FCH1, FCH2 and FCH3 unlike the case of PLURAL-FCH. Consequently, it suffices for the scheduling of the communication channels to be such a scheduling that there is no mutual interferences among signals (packets A, B and C) of the communication channels of the frames #1, #2 and #3 that are to be transmitted or received at the identical timing, as shown in FIG. 12A. There is no need to account for the interferences among signals (packets B and D, packets C and D) of the communication channels of the frames #1, #2 and #3 that are to be transmitted or received at different timings.

In contrast, in the case of PLURAL-FCH, there is a need to realize a scheduling such that there is no mutual interferences among all the signals to be transmitted or received by the communication channels of the frames #1, #2 and #3. The reason for this is as follows. Namely, in the case of PLURAL-FCH, FCH1, FCH2 or FCH3 for notifying the frame constituent elements of the frame #1, #2 or #3 will be notified only to the radio terminal 20 corresponding to the frame #1, #2, or #3. In other words, there is a need to transmit FCH1 only to the radio terminal 20 (radio terminal group #1) that is scheduled to carry out transmission or reception by using the frame #1, FCH2 only to the radio terminal 20 (radio terminal group #2) that is scheduled to carry out transmission or reception by using the frame #2, and FCH3 only to the radio terminal 20 (radio terminal group #3) that is scheduled to carry out transmission or reception by using the frame #3. Consequently, the antenna directivity is set toward the radio terminal group #1 at a time of transmitting FCH1, toward the radio terminal group #2 at a time of transmitting FCH2, and toward the radio terminal group #3 at a time of transmitting FCH3.

Here, these FCH1, FCH2 and FCH3 are transmitted to the respective radio terminal groups at the same timing immediately after BCH that is transmitted to all the radio terminals simultaneously, as shown in FIG. 12B, and for this reason there is a need to avoid the mutual interferences among FCH1, FCH2 and FCH3. Consequently, there is also a need for such a scheduling that there is no mutual interferences even among all the signals to be transmitted or received by the communication channel of the frame #1, all the signals to be transmitted or received by the communication channel of the frame #2, and all the signals to be transmitted or received by the communication channel of the frame #3, which are to be transmitted or received after FCH1, FCH2 and FCH3.

Next, the frame configuration scheduling method to be used in the radio communication system according to this embodiment will be described. In the following, the frame configuration scheduling method will be described for the case of adopting ONE-FCH and for the case of adopting PLURAL-FCH separately. Here, for the sake of simplifying the description, it is assumed that there are three modulation units 1002 and three demodulation units 1010 as shown in FIG. 2.

(A) Case of ONE-FCH

Figure 13:
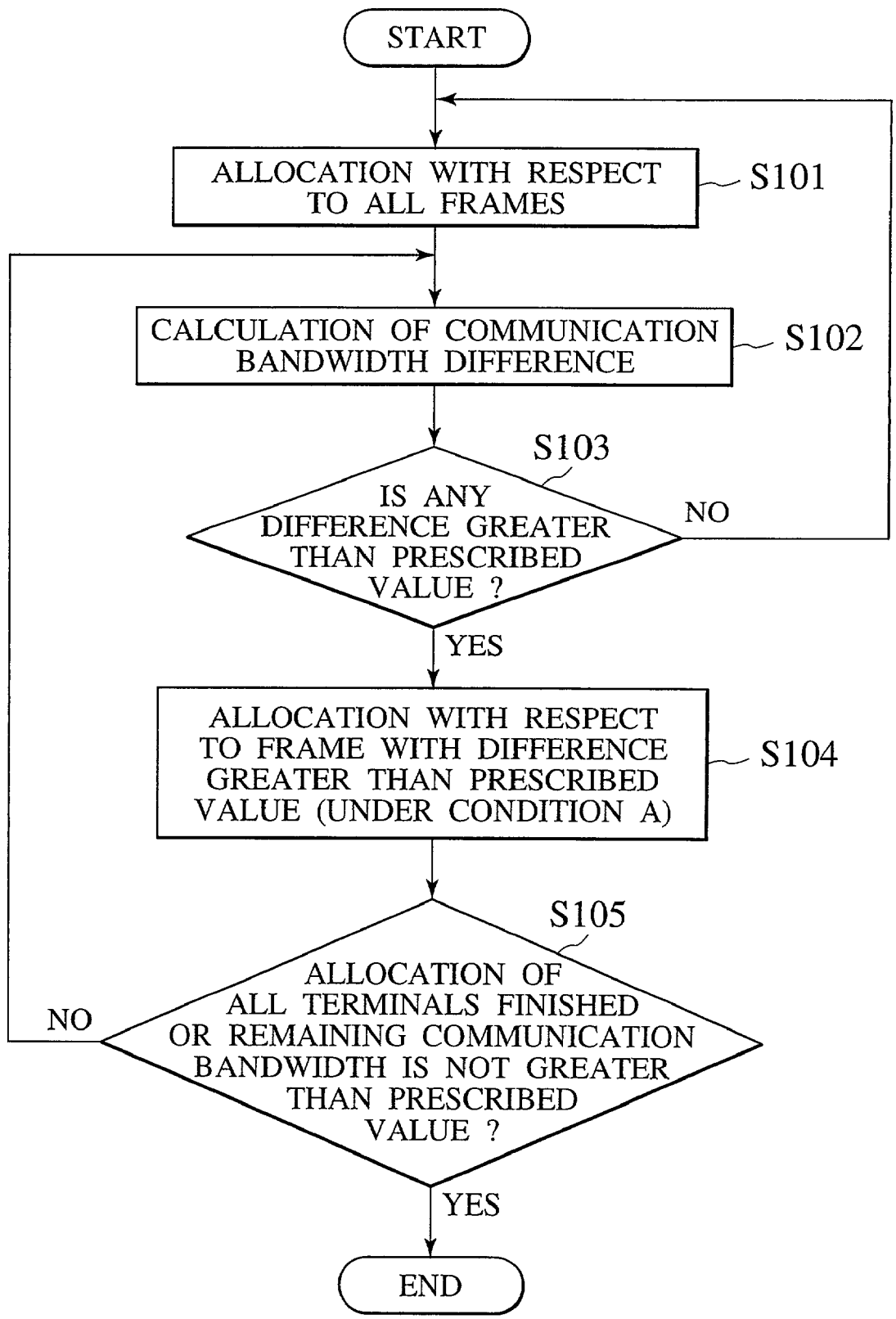
FIG. 13 is a flow chart showing a processing procedure of a first frame configuration scheduling method using ONE-FCH according to one embodiment of the present invention.

FIG. 13 shows a processing procedure of the first frame configuration scheduling method in the case of adopting ONE-FCH.

First, at the step S101 of FIG. 13, the allocation of the communication bandwidths with respect to the frames #1, #2 and #3 is carried out.

The scheduling processing unit 1012 of FIG. 2 selects one radio terminal 20a (which will be referred to as "Ma" hereafter) that requires the largest communication bandwidth in the downlink (the radio base station 10→the radio terminal 20) among the plurality of radio terminals 20 located within the service area 18 of FIG. 1. Then, the weight for the selected radio terminal Ma (which will be referred to as "Ga" hereafter) is extracted from the memory unit 1013 of FIG. 2. Here, the communication bandwidth required by the radio terminal Ma will be referred to as "Ba", Note that the "communication bandwidth" implies the bandwidth necessary in the radio channel. Thus the communication bandwidth can vary depending on the modulation scheme, the error correction scheme, the physical preamble, etc. to be applied.

Next, the scheduling processing unit 1012 selects those weights that do not interfere with the weight Ga of the selected radio terminal Ma from the memory unit 1013 and selects one radio terminal 20b (which will be referred to as "Mb" hereafter) that requires the largest communication bandwidth among the radio terminals with the selected weights. Here, the weight of the radio terminal Mb will be referred to as "Gb", and the communication bandwidth required by the radio terminal Mb will be referred to as "Bb".

Next, the scheduling processing unit 1012 selects those weights that do not interfere with the weights Ga and Gb of the selected radio terminals Ma and Mb from the memory unit 1013, and selects one radio terminal 20c (which will be referred to as "Mc" hereafter) that requires the largest communication bandwidth among the radio terminals 20 with the selected weights. Here, the weight of the radio terminal Mc will be referred to as "Gc", and the communication bandwidth required by the radio terminal Mc will be referred to as "Bc".

Among the radio terminals Ma, Mb and Mc selected in this way, the following relationships hold.

(a) The weights Ga, Gb and Gc do not interfere with each other.

(b) The sizes of the communication bandwidths Ba, Bb and Bc are in a relationship of Ba>Bb>Bc.

Figure 14:
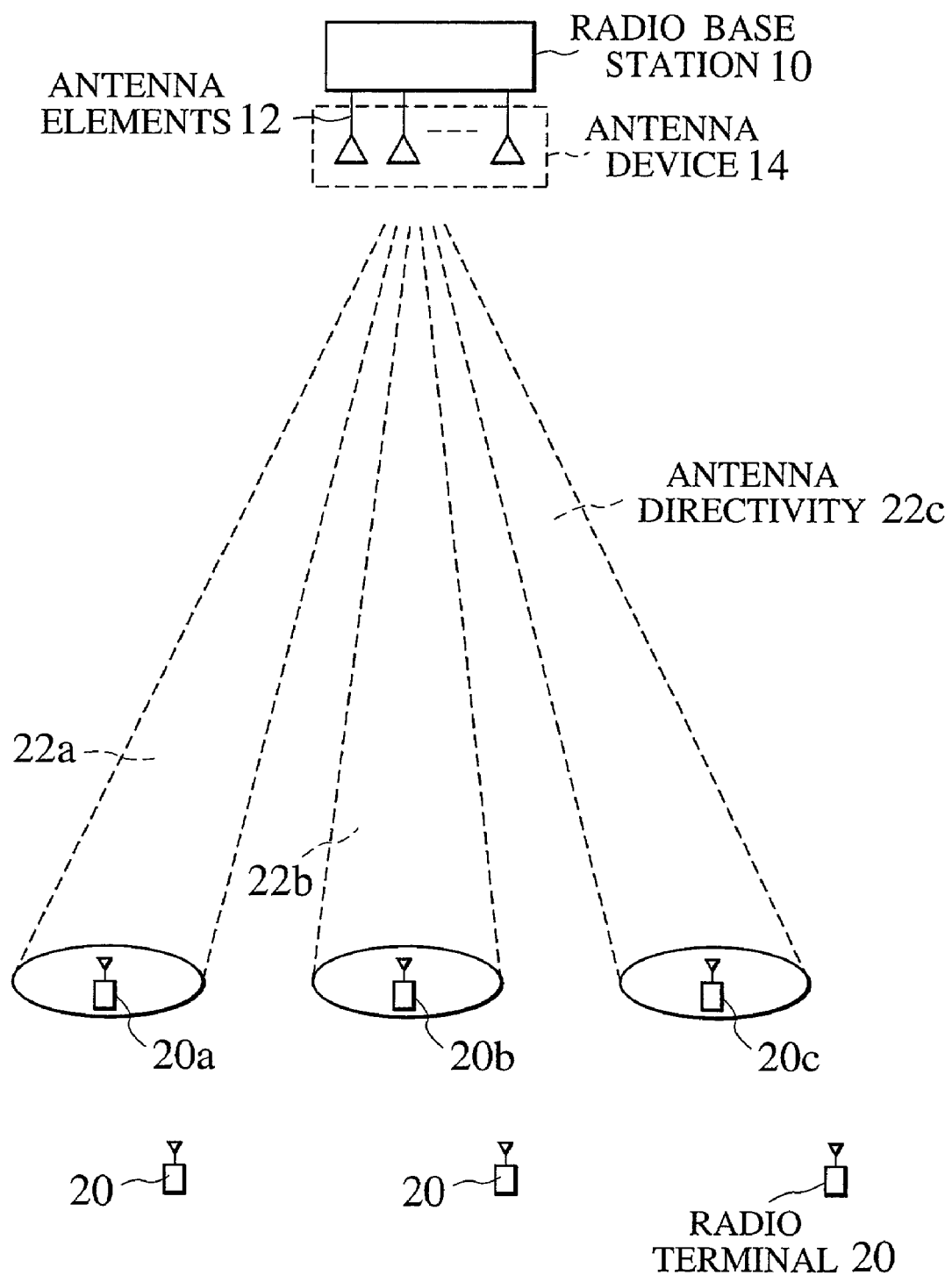
FIG. 14 is a diagram showing antenna directivities of the radio base station of FIG. 2 with respect to three radio terminals.

Then, as shown in FIG. 14, for example, the radio base station 10 forms three antenna directivity beam patterns 22a. 22b and 22c at the antenna device 14, with respect to the radio terminal Ma with the weight Ga (the radio terminal 20a), the radio terminal Mb with the weight Gb (the radio terminal 20b), and the radio terminal Mc with the weight Gc (the radio terminal 20c), respectively.

Figure 15A:
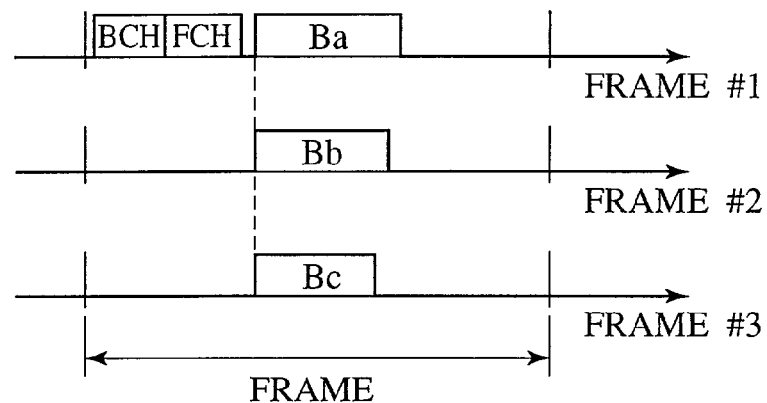
FIGS. 15A, 15B and 15C are diagrams showing states of communication bandwidth allocation with respect to three frames according to the first frame configuration scheduling method of FIG. 13.

In the following, it is assumed that the frame #1 shown in FIG. 12A is set as a reference frame at a time of carrying out the frame configuration scheduling. In this case, as shown in FIG. 15A, the scheduling processing unit 1012 allocates the communication bandwidth of the frame #1 to the radio terminal Ma with the largest required communication bandwidth, the communication bandwidth of the frame #2 to the radio terminal Mb with the next largest required communication bandwidth, and the communication bandwidth of the frame #3 to the radio terminal Mc with the smallest required communication bandwidth, for example. Then, all the communication bandwidths allocated to the radio terminals Ma, Mb and Mc are scheduled to start immediately after the notification of FCH.

Next, at the step S102 of FIG. 13, the scheduling processing unit 1012 calculates differences among the communication bandwidths Ba, Bb and Bc allocated to the frames #1, #2 and #3. More specifically, the scheduling processing unit 1012 calculates a difference between the communication bandwidth Ba allocated to the frame #1 that is the reference frame and the communication bandwidth Bb allocated to the frame #2, as well as a difference between the communication bandwidth Ba and the communication bandwidth Bc allocated to the frame #3.

Next, at the step S103 of FIG. 13, the scheduling processing unit 1012 compares each communication bandwidth difference calculated at the above step S102 with a prescribed value (threshold) that is set up in advance. When all the differences are less than or equal to the threshold (step S103 NO), all the communication bandwidths Ba, Bb and Bc are regarded as the same, while the largest communication bandwidth is set as a representative value of the three communication bandwidths Ba, Bb and Bc. This representative value will be subsequently utilized as a value common to these communication bandwidths that are regarded as the same.

Figure 15B:
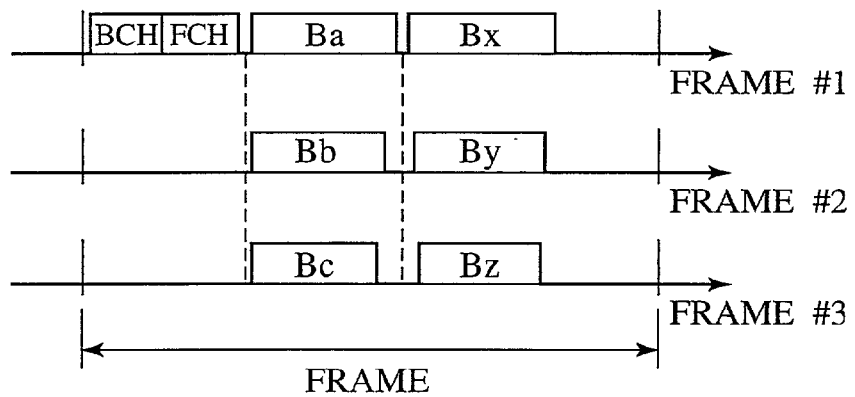

Then, the processing returns to the step S101, and the steps S101 to S103 are executed similarly with respect to the radio terminals 20 within the service area 18 other than the radio terminals Ma, Mb and Mc, as shown in FIG. 15B. Here, however, the step S101 in the second and subsequent rounds allocates the communication bandwidth after the representative value of a total sum of the communication bandwidths allocated up to this point, rather than immediately after the notification of FCHs for the frames #1, #2 and #3.

On the other hand, when there is any communication bandwidth difference which is greater than the threshold (step S103 YES), the processing proceeds to the step S104.

At the step S104 of FIG. 13, if a difference between the communication bandwidth Ba and the communication bandwidth Bb is less than the threshold but a difference between the communication bandwidth Ba and the communication bandwidth Bc is greater than the threshold, for example, the scheduling processing unit 1012 regards the communication bandwidth Ba and the communication bandwidth Bb as the same, while the larger communication bandwidth is set as the representative value.

On the other hand, the scheduling processing unit 1012 carries out the allocation of the communication bandwidth subsequent to the communication bandwidth Bc with respect to the frame #3. The scheduling processing unit 1012 selects those weights that do not interfere with the weights Ga and Gb of the radio terminals Ma and Mb that are already allocated to the frames #1 and #2 other than the frame #3 from the memory unit 1013. Then, the scheduling processing unit 1012 selects one radio terminal 20 (which will be referred to as "Md" hereafter) that requires the largest communication bandwidth among those radio terminals 20 that satisfy a condition (which will be referred to as "condition A" hereafter) that the required communication bandwidth is less than or equal to the difference between the communication bandwidth Ba and the communication bandwidth Bc. Here, the weight of the radio terminal Md will be referred to as "Gd", and the communication bandwidth required by the radio terminal Md will be referred to as "Bd".

Figure 15C:
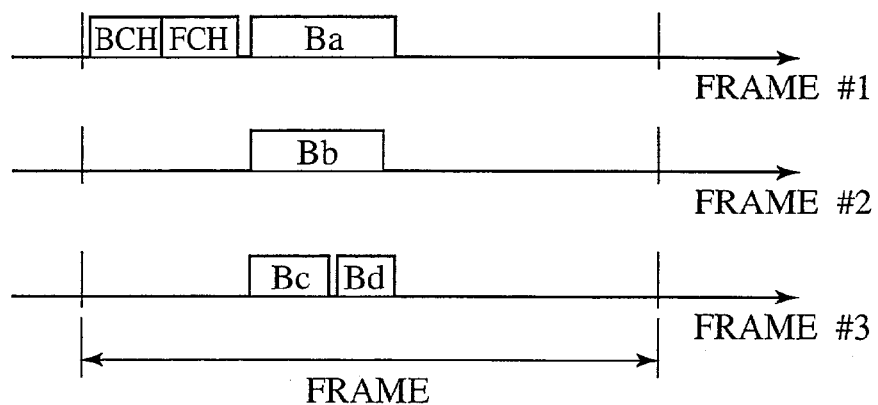

Then, the communication bandwidth Bd is allocated after the communication bandwidth Bc in the frame #3 with respect to the radio terminal Md, as shown in FIG. 15C.

At the step S105 of FIG. 13, if the allocation of the communication bandwidths with respect to all the radio terminals 20 located within the service area 18 of FIG. 1 is finished (step S105 YES), the allocation of the communication bandwidth in the downlink is finished. The allocation of the communication bandwidth in the downlink is also similarly finished when the remaining communication bandwidth for the downlink in the frames #1, #2 and #3 is not greater than a prescribed value (step S105 YES).

On the other hand, if there is a radio terminal 20 to which the communication bandwidth is not allocated yet and the remaining communication bandwidth for the downlink is greater than the prescribed value (step S105 N0), the processing returns to the step S102. Then, the scheduling processing unit 1012 calculates a difference between the communication bandwidth Ba and a total sum Bc+Bd of the communication bandwidths Bc and Bd this time, and compares this difference with the threshold at the step S103.

After the allocation to the downlink is carried out in this way, the remaining communication bandwidth will be allocated to the uplink (the radio terminal 20→the radio base station 10). In the case of the TDMA/TDD scheme, it is possible to carry out the transmission processing using one frame while the reception processing is carried out using another frame, and this causes no problem as long as there is no mutual interference so that the above described algorithm is applicable. In other words, the allocation to the uplink can be carried out similarly as the allocation to the downlink, so that the detailed description of the allocation to the uplink will be omitted here. Of course, it is not absolutely necessary to allocate the communication bandwidths for the uplink after the communication bandwidths are allocated to the downlink.

Figure 16:
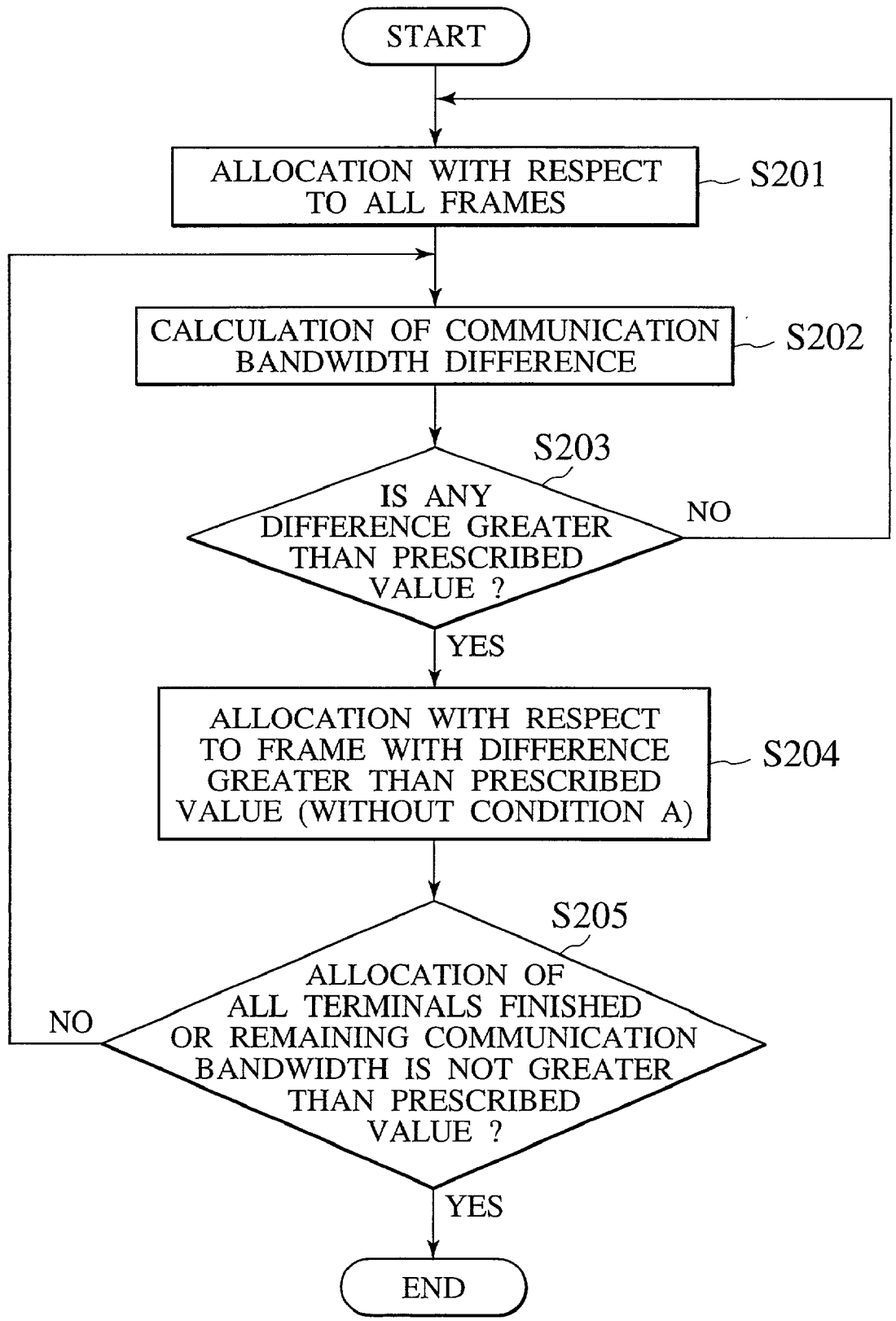
FIG. 16 is a flow chart showing a processing procedure of a second frame configuration scheduling method using ONE-FCH according to one embodiment of the present invention.

Next, the second frame configuration scheduling method in the case of adopting ONE-FCH will be described. FIG. 16 shows a processing procedure of the second frame configuration scheduling method in the case of adopting ONE-FCH. In the first scheduling method shown in FIG. 13, the limitation given by the condition A (that the required communication bandwidth is less than the difference between the communication bandwidth Ba and the communication bandwidth Bc) is applied at a time of selecting a weight to be allocated next at the step S104, it is also possible to remove this limitation. This second scheduling method is an example in which the limitation given by the condition A is removed.

The steps S201 to S203 of FIG. 16 are similar to the steps S101 to S103 of FIG. 13 so that their description will be omitted here.

At the step S204 of FIG. 16, if a difference between the communication bandwidth Ba and the communication bandwidth Bb is less than the threshold but a difference between the communication bandwidth Ba and the communication bandwidth Bc is greater than the threshold, for example, the scheduling processing unit 1012 regards the communication bandwidth Ba and the communication bandwidth Bb as the same, while the larger communication bandwidth is set as the representative value.

On the other hand, the scheduling processing unit 1012 carries out the allocation of the communication bandwidth subsequent to the communication bandwidth Bc with respect to the frame #3. The scheduling processing unit 1012 selects those weights that do not interfere with the weights Ga and Gb of the radio terminals Ma and Mb that are already allocated to the frames #1 and #2 other than the frame #3 from the memory unit 1013. Then, the scheduling processing unit 1012 selects one radio terminal 20 (which will be referred to as "Me" hereafter) that requires the largest communication bandwidth among the radio terminals 20 with the selected weights. Here, the weight of the radio terminal Me will be referred to as "Ge", and the communication bandwidth required by the radio terminal Me will be referred to as "Be".

Figure 17A:
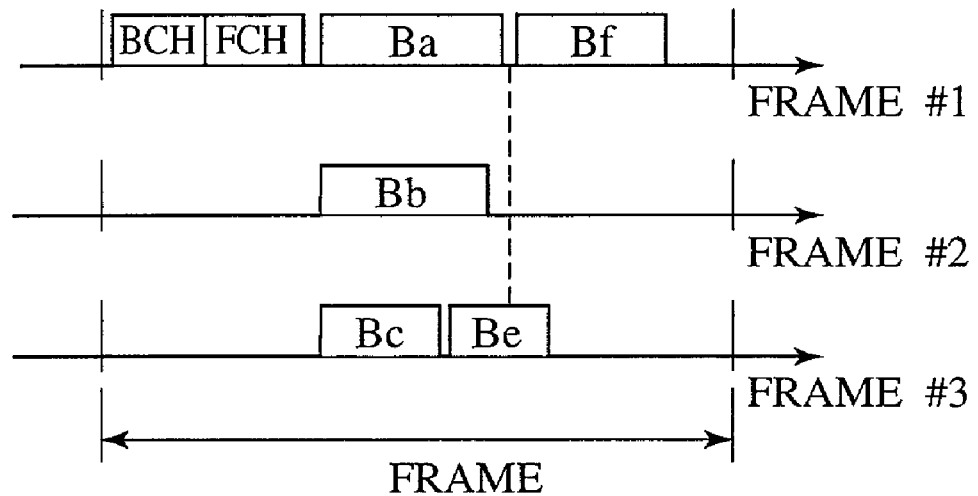
FIGS. 17A and 17B are diagrams showing states of communication bandwidth allocation with respect to three frames according to the second frame configuration scheduling method of FIG. 16.

Then, the communication bandwidth Be is allocated after the communication bandwidth Bc in the frame #3 with respect to the radio terminal Mc, as shown in FIG. 17A.

At the step S205 of FIG. 16, if the allocation of the communication bandwidths with respect to all the radio terminals 20 located within the service area 18 of FIG. 1 is finished (step S205 YES), the allocation of the communication bandwidth in the downlink is finished. The allocation of the communication bandwidth in the downlink is also similarly finished when the remaining communication bandwidth for the downlink in the frames #1, #2 and #3 is not greater than a prescribed value (step S205 YES).

On the other hand, if there is a radio terminal 20 to which the communication bandwidth is not allocated yet and the remaining communication bandwidth for the downlink is greater than the prescribed value (step S205 NO), the processing returns to the step S202. Then, the scheduling processing unit 1012 calculates a difference between the communication bandwidth Ba and a total sum Bc+Be of the communication bandwidths Bc and Be this time, and compares this difference with the threshold at the step S203. Then, if this difference is less than or equal to the threshold (step S203 NO), the scheduling processing unit 1012 regards the communication bandwidth Ba and the communication bandwidth Bc+Be are the same, and the processing returns to the step S201, while the larger communication bandwidth among the communication bandwidth Ba and the communication bandwidth Bc+Be is set as a representative value.

On the other hand, when that difference is greater than the threshold (step S203 YES), the processing proceeds to the step S204. Here, if the communication bandwidth Ba<the communication bandwidth Bc+Be, the scheduling processing unit 1012 selects those weights that do not interfere with the weight Ge from the memory unit 1013, and selects one radio terminal 20 (which will be referred to as "Mf" hereafter) that requires the largest communication bandwidth among the radio terminals 20 with the selected weights. Here, the weight of the radio terminal Mf will be referred to as "Gf", and the communication bandwidth required by the radio terminal Mf will be referred to as "Bf". Note here that the interference from the radio terminal Mc (the weight Gc) is not accounted at a time of selecting the radio terminal Mf because the communication bandwidth Ba>the communication bandwidth Bc.

Then, the communication bandwidth Bf is allocated after the communication bandwidth Ba in the frame #1 with respect to the radio terminal Mf, as shown in FIG. 17A. It is also possible to allocate the communication bandwidth Bf after the communication bandwidth Bb in the frame #2 instead.

As described, the second scheduling method is a method for carrying out the allocation of the communication bandwidths sequentially from the frame for which the total sum of the allocated communication bandwidths becomes smallest. In contrast, the first scheduling method described above is a method for carrying out the allocation of the communication bandwidths by using the reference frame (which is the frame #1 here) such that the total sum of the communication bandwidths allocated to the frames other than the frame #1 always becomes less than or equal to the total sum of the communication bandwidths allocated to the frame #1.

Figure 17B:
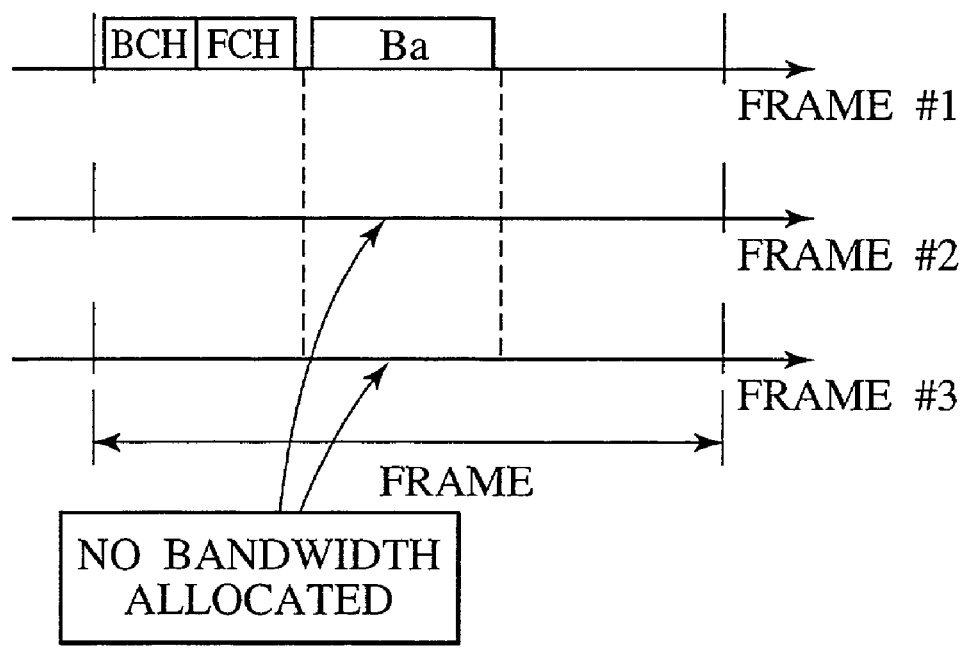

Note that, at the steps S101, S104, S201 and S204 of the first and second scheduling methods described above, if there is no radio terminal 20 that does not interfere, the allocation of the communication bandwidths will be interrupted. For example, as shown in FIG. 17B, if there is no radio terminal 20 that does not interfere with the communication bandwidth Ba allocated to the frame #1, the allocation of the communication bandwidths with respect to the frames #2 and #3 of the same timing is interrupted, and then the allocation will be carried out after the communication bandwidth Ba of the frame #1. Note however that, in this case, the total sum of the communication bandwidths allocated to the frames #2 and #3 will be regarded as the same as the total sum of the communication bandwidth allocated to the frame #1.

As far as the random access channel is concerned, basically the antenna device 14 with no directivity will be used and the demodulation processing will be carried out by using the demodulation unit 1010 selected by the modulation/demodulation unit selection unit 1020 of FIG. 10, similarly as in the case of BCH. Note however that it is also possible to use the antenna device 14 with the directivities for dividing the space into three and carry out the demodulation processing by utilizing three demodulation units 1010.

Note also that the first and second scheduling methods described above are directed to the case of managing the weight and the communication bandwidth for each radio terminal 20, but it is also possible to classify the radio terminals 20 into groups according to their weights. In this case, the scheduling processing unit 1012 regards those radio terminals 20 for which the weight can be regarded as the same, as one group. In this regard, it suffices to consider the radio terminals Ma, Mb and Mc described above as groups of radio terminals with the weights Ga, Gb and Gc respectively.

Figure 18:
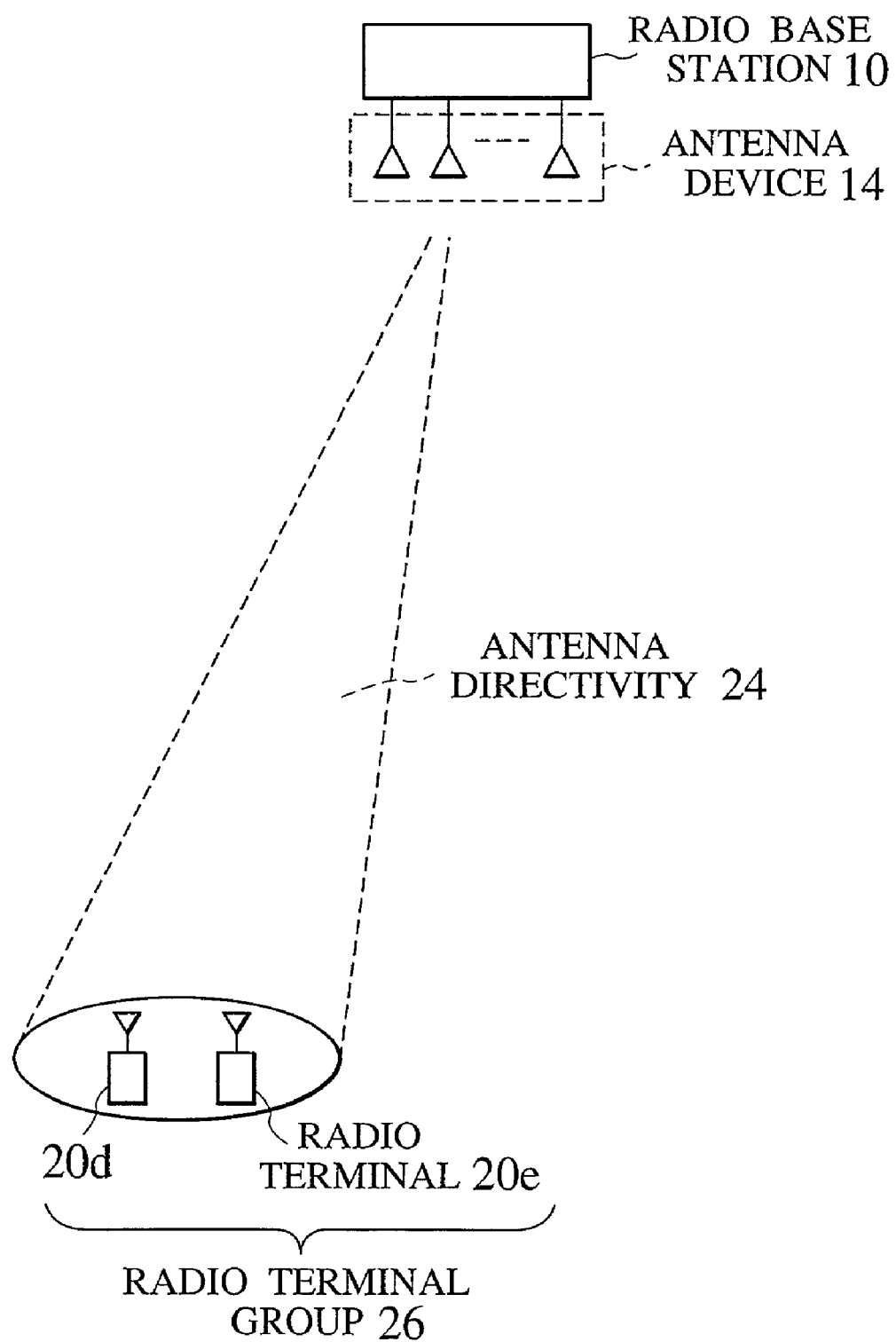
FIG. 18 is a diagram showing antenna directivity of the radio base station of FIG. 2 with respect to a radio terminal group.

As shown in an example of FIG. 18, the radio terminals 20d and 20e can be regarded as a radio terminal group 26 with the same weight. Then, the radio terminal group is scheduled to carry out communications by using the same frame. Also, the consecutive communication bandwidths will be allocated to the radio terminals of the same radio terminal group that carry out the transmission by using the same frame. In this way, there is no need to provide a guard time for the purpose of setting up the weights for the antenna elements 12 so that the frame efficiency can be improved. In other words, it is effective for the effective utilization of the frequencies.

(B) Case of PLURAL-FCH

FIG. 19 shows a processing procedure of the frame configuration scheduling method in the case of adopting PLURAL-FCH.

Figure 20A:
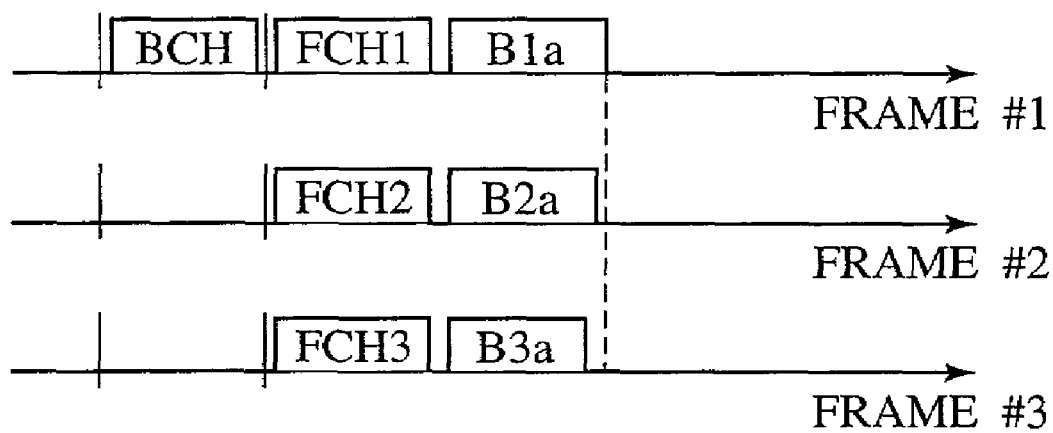
FIGS. 20A and 20B are diagrams showing states of communication bandwidth allocation with respect to three frames according to the frame configuration scheduling method of FIG. 19.

The step S301 of FIG. 19 is similar to the step S101 of FIG. 13 so that its description will be omitted here. It is assumed here that a radio terminal M1a is allocated to the frame #1, a radio terminal M2a is allocated to the frame #2, and a radio terminal M3a is allocated to the frame #3 as shown in FIG. 20A. Here, the weight of the radio terminal M1a will be referred to as "G1a", and the communication bandwidth required by the radio terminal M1a will be referred to as "B1a". Similarly, the weight of the radio terminal M2a will be referred to as "G2a", and the communication bandwidth required by the radio terminal M2a will be referred to as "B2a", while the weight of the radio terminal M3a will be referred to as "G3a", and the communication bandwidth required by the radio terminal M3a will be referred to as "B3a".

Next, at the step S302 of FIG. 19, the scheduling processing unit 1012 calculates a total sum of the communication bandwidths allocated to each of the frames #1, #2 and #3.

Next, at the step S303 of FIG. 19, the scheduling processing unit 1012 carries out the scheduling with respect to the frame for which the total sum of the communication bandwidths calculated at the step S302 is the smallest among the frames #1, #2 and #3. For example, if the total sum of the bandwidths allocated to the frame #3 is the smallest as shown in an example of FIG. 20A, the scheduling processing unit 1012 selects those weights that do not interfere with the weights (G1a and G2a here) of the radio terminals 20 that are already allocated to the frames #1 and #2 other than the frame #3 from the memory unit 1013. Then, the scheduling processing unit 1012 selects one radio terminal 20 (which will be referred to as "M3b" hereafter) that requires the largest communication bandwidth among those radio terminals 20 with the selected weights. Here, the weight of the radio terminal M3b will be referred to as "G3b", and the communication bandwidth required by the radio terminal M3b will be referred to as "B3b".

Figure 20B:
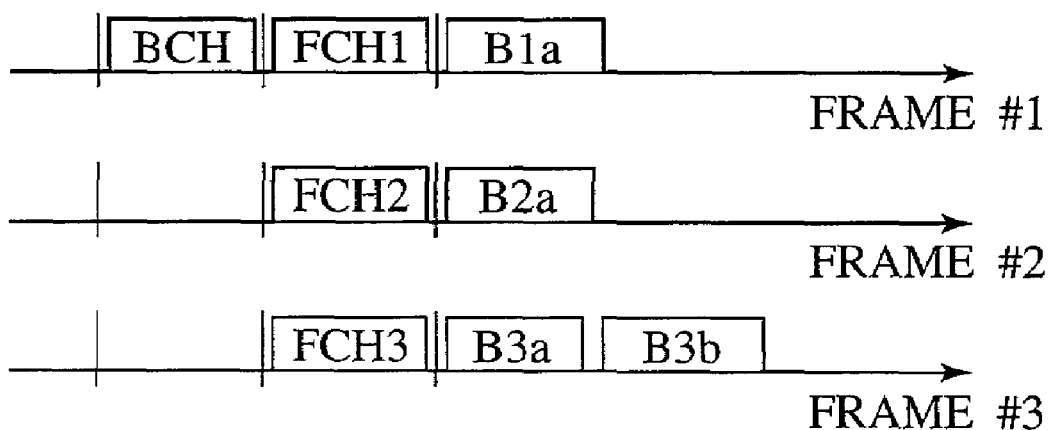

Then, the communication bandwidth B3b is allocated after the communication bandwidth B3a in the frame #3 with respect to the radio terminal M3b, as shown in FIG. 20B.

At the step S304 of FIG. 19, if the allocation of the communication bandwidths with respect to all the radio terminals 20 located within the service area 18 of FIG. 1 is finished (step S304 YES), the allocation of the communication bandwidth in the downlink is finished. The allocation of the communication bandwidth in the downlink is also similarly finished when the remaining communication bandwidth for the downlink in the frames #1, #2 and #3 is not greater than a prescribed value (step S304 YES).

On the other hand, if there is a radio terminal 20 to which the communication bandwidth is not allocated yet and the remaining communication bandwidth for the downlink is greater than the prescribed value (step S304 N0), the processing returns to the step S302. Then, the allocation of the communication bandwidths with respect to each of the frames #1, #2 and #3 is carried out by repeating the steps S302 to S304. Note that, at the step S302, if there is no radio terminal 20 that does not interfere, the allocation of the communication bandwidths with respect to that frame will be interrupted, and the allocation of the communication bandwidths with respect to another frame will be carried out.

After the allocation to the downlink is carried out in this way, the remaining communication bandwidth will be allocated to the uplink. In the case of the TDMA/TDD scheme, similarly as in the case of ONE-FCH, it is possible to carry out the transmission processing using one frame while the reception processing is carried out using another frame, and this causes no problem as long as there is no mutual interference so that the above described algorithm is applicable. In other words, the allocation to the uplink can be carried out similarly as the allocation to the downlink, so that the detailed description of the allocation to the uplink will be omitted here. Of course, it is not absolutely necessary to allocate the communication bandwidths for the uplink after the communication bandwidths are allocated to the downlink.

Also, in the case of grouping the radio terminals 20 according to their weights, the scheduling similar to the above described will be carried out by considering the radio terminals M1a, M2a, M3a and M3b described above as groups of radio terminals with the weights G1a, G2a, G3a and G3b respectively.

It is to be noted that the above description is directed to the case of using the TDMA/TDD frame as the frame configuration, but the present invention is not limited to this case and it is also applicable to the case of using the TDMA/FDD scheme. In the case of the TDMA/FDD frame, different frequencies will be used for the transmission and the reception so that the scheduling is carried out totally independently for the transmission and the reception, but the scheduling method similar to the above described embodiment can be used basically. Note that in this case the switches 1006 in FIG. 2 should be replaced by duplexers, and the method for deriving the weights for the purpose of the beam formation (for the transmission) will be changed.

As described, according to the present invention, it becomes possible for the radio base station to realize the radio communications with different radio terminals at the same time using the same frequency, so that it is possible to increase the number of radio terminals that can be accommodated by the radio base station.

Also, it is possible to suppress the interferences by controlling the antenna directivity 22a–c, 24 (see FIGS. 14 and 18) of the antenna so that it is possible to improve the communication quality. It is also possible to shorten the switching time necessary for the antenna control by allocating the consecutive communication bandwidths in the same frame with respect to the radio terminals for which the antenna directivity is similar. In addition, it is also possible to allocate the communication bandwidths efficiently so that the frequency utilization efficiency can be improved.

In other words, in the present invention, a plurality of time division multiplexed frames are transmitted through a plurality of space dividing beams such that it becomes possible for the radio base station to realize the radio communications with different radio terminals at the same time using the same frequency, and therefore it is possible to increase the number of radio terminals that can be accommodated by the radio base station.

It is to be noted that a part of the above described embodiment according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the scheduling processing unit in the above described embodiment can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, in the embodiments described above, "no mutual interference" does not necessarily implies absolutely zero interference and should be construed as meaning "substantially no mutual interference", i.e., the amount of interference is less than a prescribed threshold.

It is also to be noted that, besides those already mentioned above, many modifications and variations of the above embodiment may be made without departing from the novel and advantageous features of the present invention. Accordingly, all such modifications and variations are intended to be included within the scope of the appended claims.

What is claimed is:

1. A frame configuration method for time division multiplexed frames to transfer signals between a radio base station and a plurality of radio terminals, the frame configuration method comprising:

(a) allocating communication bandwidths of an identical time in different frames to different radio terminals such that there is substantially no mutual interference among those signals to be transferred at the identical time with respect to the different radio terminals; and (b) allocating entire frame configuration information indicating frame configurations of all the time division multiplexed frames to one of the time division multiplexed frames, wherein the step (b) allocates the entire frame configuration information to a frame to which a control information to be transmitted to all the radio terminals simultaneously is allocated, wherein when there is a difference between total sums of the communication bandwidths allocated to the time division multiplexed frames, the step (a) allocates a next communication bandwidth to a frame for which a total sum of allocated communication bandwidths is the smallest among the time division multiplexed frames, wherein the step (a) determines the next communication bandwidth to be allocated such that a total sum of allocated communication bandwidths for a reference frame selected in advance among the time division multiplexed frames is not exceeded by a total sum of allocated communication bandwidths for any other time division multiplexed frames.

2. The frame configuration method of claim 1, wherein the step (a) compares the difference between the total sums of the communication bandwidths with a prescribed threshold.

3. The frame configuration method of claim 2, wherein when the difference between the total sums of the communication bandwidths is less than or equal to the prescribed threshold, the step (a) regards the total sums of the communication bandwidths as identical.

4. A frame configuration method for time division multiplexed frames to transfer signals between a radio base station and a plurality of radio terminals, the frame configuration method comprising:

(a) allocating communication bandwidths in different frames to different radio terminals such that there is substantially no mutual interference among those signals to be transferred with respect to the different radio terminals; and (b) allocating a plurality of frame configuration information each indicating a frame configuration of a respective time division multiplexed frame, to corresponding ones of the time division multiplexed frames respectively, wherein the step (a) allocates a next communication bandwidth to a frame for which a total sum of allocated communication bandwidths is the smallest among the time division multiplexed frames, wherein the step (a) determines the next communication bandwidth to be allocated such that a total sum of allocated communication bandwidths for a reference frame selected in advance among the time division multiplexed frames is not exceeded by a total sum of allocated communication bandwidths for any other time division multiplexed frames.

* * * * *